(12) United States Patent
Katsura et al.

(10) Patent No.: US 10,886,799 B2
(45) Date of Patent: Jan. 5, 2021

(54) ROTARY ELECTRIC MACHINE

(71) Applicant: EXEDY CORPORATION, Neyagawa (JP)

(72) Inventors: Hitoshi Katsura, Neyagawa (JP); Taichi Kitamura, Neyagawa (JP); Kimitaka Uemura, Neyagawa (JP)

(73) Assignee: EXEDY CORPORATION, Neyagawa (JP)

( * ) Notice: Subject to any disclaimer, the term of this patent is extended or adjusted under 35 U.S.C. 154(b) by 38 days.

(21) Appl. No.: 16/385,077

(22) Filed: Apr. 16, 2019

(65) Prior Publication Data
US 2019/0334395 A1    Oct. 31, 2019

(30) Foreign Application Priority Data

Apr. 27, 2018  (JP) .................................. 2018-087331
May 31, 2018  (JP) .................................. 2018-105413
Feb. 4, 2019   (JP) .................................. 2019-017678

(51) Int. Cl.
*H02K 1/22* (2006.01)
*H02K 3/52* (2006.01)
(Continued)

(52) U.S. Cl.
CPC ............ *H02K 1/226* (2013.01); *H02K 1/243* (2013.01); *H02K 3/528* (2013.01); *H02K 15/022* (2013.01); *H02K 19/24* (2013.01); *H02K 21/044* (2013.01)

(58) Field of Classification Search
CPC ........ H02K 1/226; H02K 1/243; H02K 3/528; H02K 15/022; H02K 21/044; H02K 21/048; H02K 21/026; H02K 1/182; H02K 19/24
(Continued)

(56) References Cited

U.S. PATENT DOCUMENTS 2,651,733 A *  9/1953  Stark ..................... H02K 1/2713
                                                    310/111
2,928,963 A *  3/1960  Bertsche ................ H02K 19/24
                                                    310/168
(Continued)

FOREIGN PATENT DOCUMENTS

JP           3445492 B2    9/2003
JP        2010-516558 A    5/2010

OTHER PUBLICATIONS

Extended European Search Report for the corresponding European Patent Application No. 19171310.6, dated Sep. 13, 2019, 8 pp.

*Primary Examiner* — Quyen P Leung
*Assistant Examiner* — Alexander A Singh
(74) *Attorney, Agent, or Firm* — United IP Counselors, LLC

(57) ABSTRACT

A rotary electric machine includes a stator, a rotor, and a field coil; the rotor includes a first magnetic pole having a first annular portion and a plurality of claw portions and a second magnetic pole having a second annular portion and a plurality of projection portions; in the rotor, the claw portions and the projection portions are circumferentially alternately positioned, and the first magnetic pole and the second magnetic pole are maintained in a non-contact state by providing a radial gap, a circumferential gap, and an axial gap between the first magnetic pole and the second magnetic pole; and the gap arrangement member has an axial positioning portion that is axially locked with respect to at least one of the first magnetic pole and the second magnetic pole, and axially positions the first magnetic pole and the second magnetic pole.

17 Claims, 17 Drawing Sheets

(51) Int. Cl.
*H02K 1/24* (2006.01)
*H02K 21/04* (2006.01)
*H02K 19/24* (2006.01)
*H02K 15/02* (2006.01)

(58) Field of Classification Search
USPC .................................................. 310/263, 266
See application file for complete search history.

(56) References Cited

U.S. PATENT DOCUMENTS

| | | | | |
|---|---|---|---|---|
| 3,555,327 | A | * | 1/1971 | Terry ...................... H02K 5/15 |
| | | | | 310/168 |
| 6,400,060 | B1 | * | 6/2002 | Pfleuger ................. H02K 19/24 |
| | | | | 310/263 |
| 2006/0055280 | A1 | | 3/2006 | Isoda et al. |
| 2009/0283344 | A1 | | 11/2009 | Arnold et al. |
| 2012/0293039 | A1 | | 11/2012 | Hayashi et al. |
| 2013/0300242 | A1 | * | 11/2013 | Yamada ............... H02K 21/044 |
| | | | | 310/156.08 |
| 2016/0352203 | A1 | * | 12/2016 | Kusase .................. H02K 1/246 |

\* cited by examiner

ROTARY ELECTRIC MACHINE

BACKGROUND OF THE INVENTION

1. Field of the Invention

The present invention relates to a brushless wound field type rotary electric machine.

2. Description of the Related Art

As a related art, JP 3445492 B2 discloses a brushless wound field type rotary electric machine in which a stator is disposed radially outside a rotor and magnetic flux is supplied from a field coil that is stationary with respect to the rotor, and thus eliminating a brush that is necessary to magnetize the rotor.

JP 2010-516558 A discloses a structure in which an engine and a rotary electric machine are connected so that the rotary electric machine functioning as an electric motor at the time of engine startup and functioning as a generator during traveling is disposed on the outer circumference of a power transmission device.

By combining JP 3445492 B2 with JP 2010-516558 A, the three members of a stator, a rotor, and a field coil are disposed on positions coaxial with a rotation axis and of different diameters in a narrow space on the outer circumferential side of a power transmission device. Therefore, a severe restriction is imposed on the volume of a rotary electric machine, the degree of freedom of design is restricted, and the output performance of the rotary electric machine is limited.

A brushless wound field type rotary electric machine in which a first magnetic pole and a second magnetic pole are positioned while being maintained in a non-contact state with a simple configuration in a rotor of a rotary electric machine, thereby increasing the degree of freedom of design and improving the output performance is desired.

SUMMARY OF THE INVENTION

Therefore, an object of the present invention is to provide a brushless wound field type rotary electric machine in which a first magnetic pole and a second magnetic pole are positioned while being maintained in a non-contact state with a simple configuration.

In order to solve the above problem, a rotary electric machine according to one aspect of this invention includes:

a stator having a stator winding that generates a rotating magnetic field by an alternating current;

a rotor that is rotatably held about a rotation axis with respect to the stator; and a field coil that excites the rotor by a direct current, wherein:

the rotor includes a first magnetic pole that has a first annular portion and a plurality of claw portions extending in an axial direction of the rotation axis from the first annular portion, and a second magnetic pole that has a second annular portion and a plurality of projection portions radially projecting on an outer circumferential surface of the second annular portion;

in the rotor, the claw portions of the first magnetic pole and the projection portions of the second magnetic pole are circumferentially alternately positioned, and the first magnetic pole and the second magnetic pole are maintained in a non-contact state by providing a radial gap, a circumferential gap, and an axial gap between the first magnetic pole and the second magnetic pole;

the rotor further includes a gap arrangement member of a non-magnetic material arranged in the radial gap or the circumferential gap; and the gap arrangement member has an axial positioning portion that is axially locked with respect to at least one of the first magnetic pole and the second magnetic pole, and axially positions the first magnetic pole and the second magnetic pole.

According to the present invention, radial positioning or circumferential positioning of the first magnetic pole and the second magnetic pole is performed by the gap arrangement member of the non-magnetic material arranged in the radial gap or the circumferential gap, and axial positioning is performed by the axial positioning portion of the gap arrangement member. Accordingly, by the gap arrangement member providing the plurality of functions, the structure in which the first magnetic pole and the second magnetic pole are positioned while being maintained in a non-contact state radially or circumferentially and axially can be simply and easily achieved.

DETAILED DESCRIPTION OF THE INVENTION

Hereinafter, embodiments of a rotary electric machine 1 according to the present invention will be described with reference to the drawings.

First, an overall configuration of the rotary electric machine 1 will be described with reference to FIG. 1.

Figure 1:
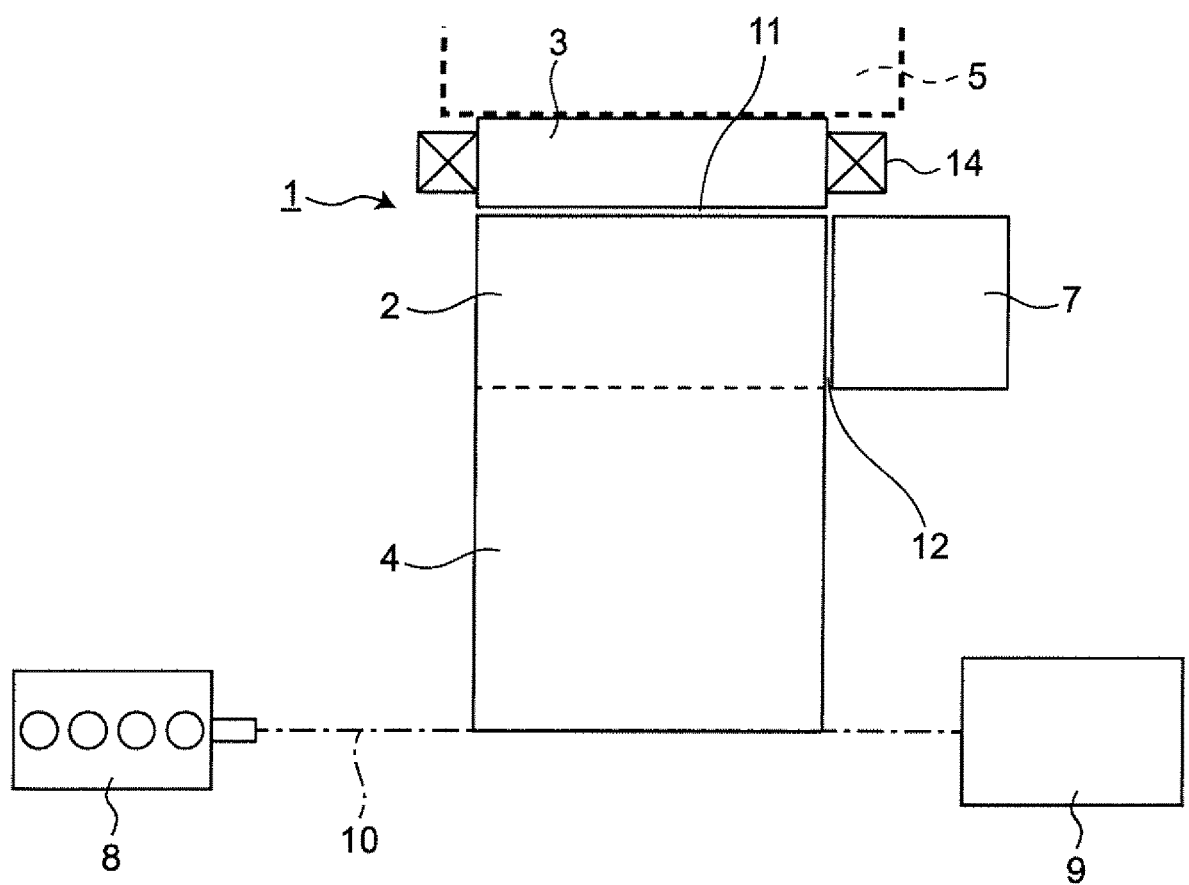
FIG. 1 is a diagram illustrating a schematic configuration of a rotary electric machine.

As shown in FIG. 1, the rotary electric machine 1 is a brushless wound field type rotary electric machine 1 disposed between an engine 8 and a transmission 9 of a vehicle along a rotation axis 10 and positioned between a power transmission device 4 and a case 5 including the power transmission device 4. The rotary electric machine 1 includes at least a rotor 2, a stator 3, and a field coil 7. The power transmission device 4 is disposed in a power transmission path from an output shaft of the engine 8 to the transmission 9, and is, for example, a torque converter, a friction type clutch, a fluid coupling, or the like.

The stator 3 is a cylindrical member that is fixedly held in the case 5 in a non-rotatable manner. The stator 3 includes, for example, a stator core in which electromagnetic steel plates are laminated, a plurality of slots formed in the stator core, and a plurality of stator windings 14 mounted in the slots. The stator 3 includes the stator winding 14 therein, and generates a rotating magnetic field by an alternating current flowing through the stator winding 14.

The rotor 2 is connected to a synchronous rotary member rotating synchronously with the output shaft of the engine 8, and a central axis of the output shaft of the engine 8 is the rotation axis 10. Therefore, the output shaft of the engine 8 and the rotation axis 10 of the rotor 2 of the rotary electric machine 1 have the same central axis.

The rotor 2 is fixedly disposed on an outer shell (synchronous rotary member) of the power transmission device 4. An outer circumferential surface of the rotor 2 faces an inner circumferential surface of the stator 3, and an end face of the rotor 2 on the transmission 9 side faces an end face of the field coil 7 on the engine 8 side. Thus, the rotor 2 is rotatably held with respect to the stator 3 and the field coil 7 about the rotation axis 10. As will be described later, the rotor 2 has a first magnetic pole 21 and a second magnetic pole 22.

The field coil 7 is shifted to the transmission 9 side with respect to the rotor 2 along the rotation axis 10, disposed side by side along the rotation axis 10 with respect to the rotor 2, and is fixedly held on the case 5 on the transmission 9 side. The field coil 7 is provided inside a field core 6 (illustrated in FIG. 11), and excites magnetic flux by a direct current. It should be noted that the field coil 7 can also be shifted to the engine 8 side with respect to the rotor 2 along the rotation axis 10 and disposed side by side with respect to the rotor 2 via a second air gap 12.

A first air gap 11 is formed between the rotor 2 and the stator 3, and delivers magnetic flux between the rotor 2 and the stator 3 via the first air gap 11. The first air gap 11 is a gap formed between the inner circumferential surface of the stator 3 and the outer circumferential surface of the rotor 2 and extends axially along the rotation axis 10.

The second air gap 12 is formed between the rotor 2 and the field core 6, and delivers magnetic flux between the rotor 2 and the field coil 7 via the second air gap 12. The second air gap 12 is a gap formed between the end portion on the transmission 9 side in the axial direction of the rotation axis 10 of the rotor 2 and the end portion on the engine 8 side of the field core 6.

In this way, the field coil 7 is disposed side by side in the axial direction of the rotation axis 10 with respect to the rotor 2 via the second air gap 12. According to this configuration, since the field coil 7 is arranged being axially shifted with respect to the rotor 2, an increase in the radial thickness of the field coil 7 allows magnetic flux of the field coil 7 to be increased and the degree of freedom of design to be increased.

In the rotary electric machine 1 having the configuration described above, magnetic flux by the field coil 7 is generated when the field coil 7 is energized. Magnetic flux by the field coil 7 is configured to return from the field core 6 to the field core 6 via the second air gap 12, the first magnetic pole 21 of the rotor 2, the first air gap 11, the stator 3, the first air gap 11, the second magnetic pole 22 of the rotor 2, and the second air gap 12. At this time, for example, if the direct current is applied to the field coil 7, magnetic flux by the field coil 7 is generated, and the first magnetic pole 21 and the second magnetic pole 22 are magnetized into, for example, the N pole and the S pole, respectively.

A case where the rotary electric machine 1 is caused to function as an electric motor (starter motor) at the time of starting the engine 8 will be described. Based on a start command of the engine 8, an unillustrated inverter is driven to flow a three-phase alternating current through the stator 3 to magnetize the stator 3, and flow the direct current through the field coil 7. When the direct current flows through the field coil 7, the first magnetic pole 21 and the second magnetic pole 22 of the rotor 2 are excited. As a result, the rotor 2 starts to rotate with respect to the stator 3, and an electromotive force having an induced voltage is generated in the stator 3.

After that, the induced voltage increases in response to a rotational speed of the rotor 2. When the rotational speed reaches a rotational speed of the initial explosion lower than the idling rotational speed corresponding to the idling of the engine 8 and the start of the engine 8 is completed, the driving of the inverter is stopped, and thereafter, transition is made automatically to a power generation mode, i.e., a case where the rotary electric machine 1 is caused to function as a generator (alternator), so as to hold a predetermined induced voltage (required voltage).

In this power generation mode, when the field coil 7 continues to be excited, the excitation current is adjusted so that the induced voltage becomes constant at a predetermined induced voltage. The excitation current is adjusted so that the magnetizing force of the rotor 2 decreases as the rotational speed increases, thereby making the induced voltage constant. When the field coil 7 is not excited, the advance angle of the three-phase alternating current is adjusted by the inverter so that the induced voltage becomes constant at a predetermined induced voltage. It may also be adjusted by combining the above two methods. By controlling in this manner, when the rotor 2 rotates, the rotary electric machine 1 functions as a generator.

As a result, when the engine 8 and the rotary electric machine 1 are connected together, the rotary electric machine 1 can function as an electric motor (starter motor) at the time of starting the engine and can function as a generator (alternator) during traveling.

First Embodiment

Next, the configuration of the rotor 2 of the rotary electric machine 1 according to the first embodiment will be described in detail with reference to FIG. 2 to FIG. 8.

Figure 2:
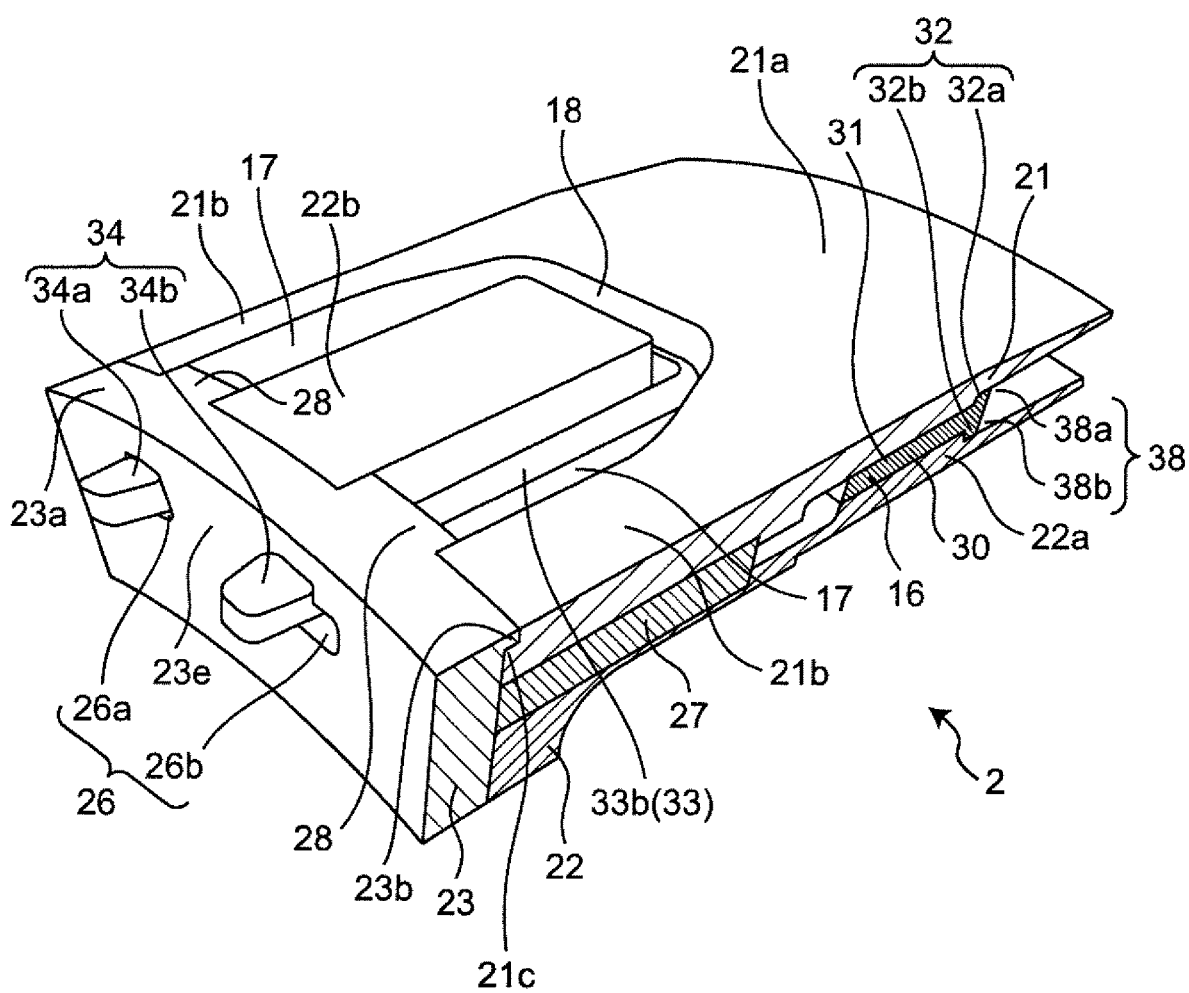
FIG. 2 is a perspective view of a rotor of the rotary electric machine according to the first embodiment of the present invention, when cut vertically along the rotation axis.

As shown in FIG. 2, the rotor 2 is a claw pole type, and includes the first magnetic pole 21, the second magnetic pole 22, and a magnetic pole holding member 23.

The first magnetic pole 21 has a first annular portion 21a and a plurality of claw portions 21b, and is composed of, for example, a soft magnetic material such as iron. The claw portion 21b extends in the axial direction of the rotation axis 10 from the first annular portion 21a. The claw portion 21b has, for example, a rectangular thin plate shape. The claw portions 21b are disposed at regular intervals, e.g., at equal intervals, in the circumferential direction, and the axial lengths of the claw portions 21b are all the same. The outer circumferential surface of each of the claw portions 21b extends on the same circumference as the outer circumferential surface of the first annular portion 21a. The claw portion 21b is configured to be in a non-contact state with respect to the second magnetic pole 22 and to have a radial gap 16 in the radial direction when the first magnetic pole 21 and the second magnetic pole 22 are combined.

Figure 6:
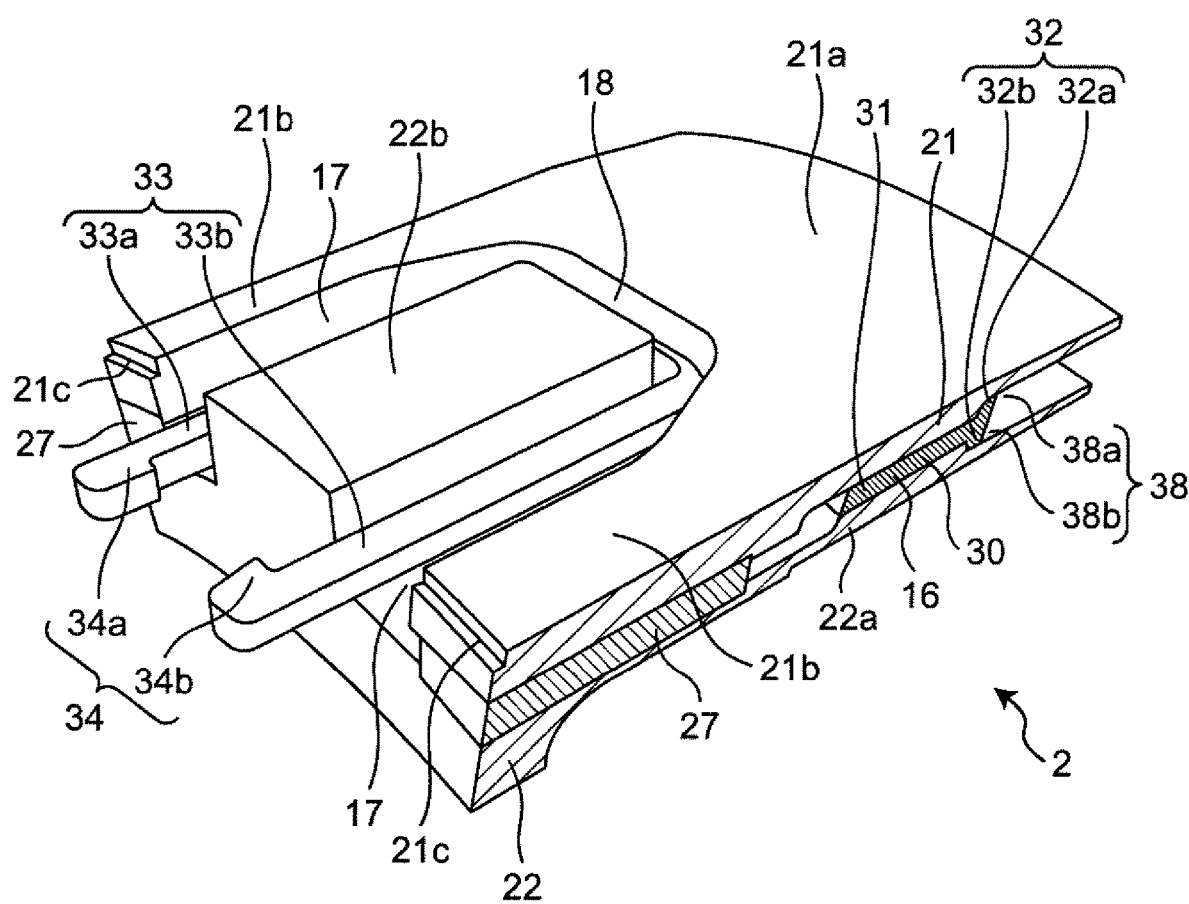
FIG. 6 is a perspective view of the rotor shown in FIG. 2 with a magnetic pole holding member removed therefrom.

As shown in FIG. 6, each of the claw portions 21b extends to an end edge of the engine 8 side of the first annular portion 21a, thereby forming a first tip end locking portion 21c. The first tip end locking portion 21c is a stepped portion formed by notching the outer circumferential end edge of the claw portion 21b. The outer circumferential surface of each of the first tip end locking portions 21c is positioned on the same circumference about the central axis of the rotation axis 10.

The second magnetic pole 22 has a second annular portion 22a and a plurality of projection portions 22b, and is composed of, for example, a soft magnetic material such as iron. The second annular portion 22a has the radial gap 16 with respect to the first annular portion 21a and the claw portion 21b, and is disposed so as to partially overlap with the claw portion 21b as viewed from the radial direction. The projection portion 22b protrudes radially outwards from the outer circumferential surface of the second annular portion 22a. The projection portions 22b are disposed with a circumferential gap 17 in the circumferential direction with respect to the claw portions 21b. The projection portion 22b has, for example, a rectangular plate shape. The projection portions 22b are also disposed at regular intervals, e.g., at equal intervals, in the circumferential direction, and the radial heights of the projection portions 22b are all the same. The axial lengths of the projection portions 22b are all the same and are shorter than the axial lengths of the claw portions 21b. The outer circumferential surface of each of the projection portions 22b is positioned on the same outer circumference as the outer circumferential surface of each of the claw portions 21b about the central axis of the rotation axis 10.

Figure 3:
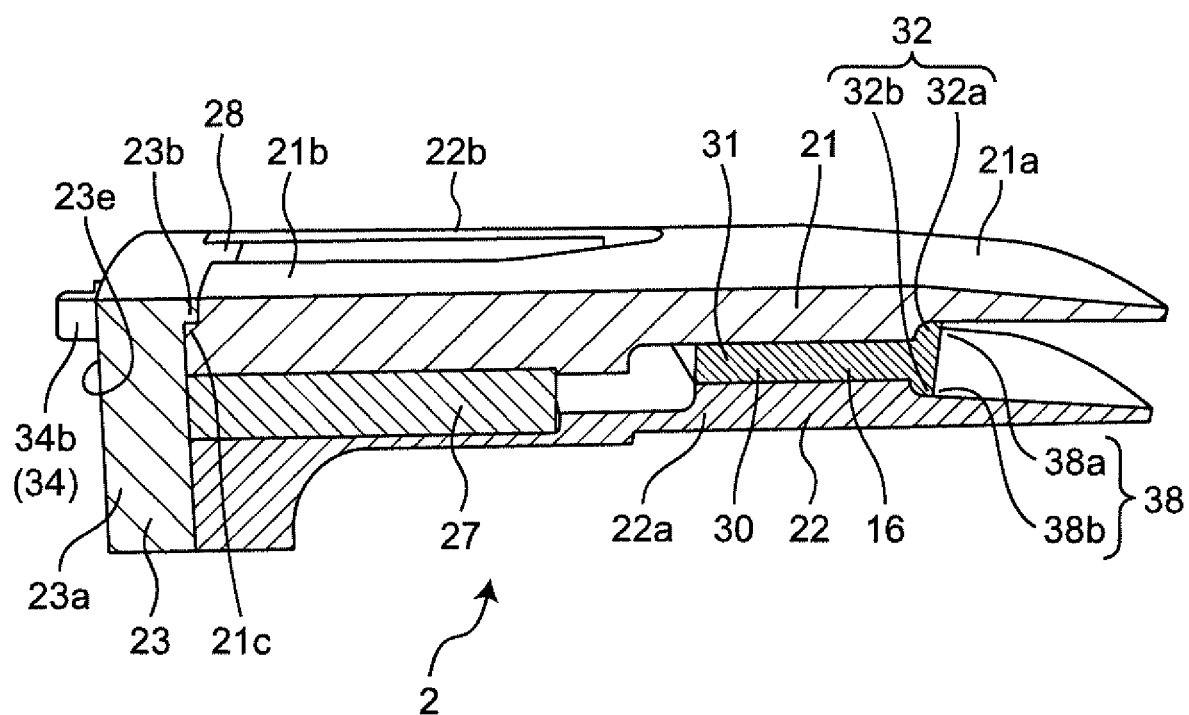
FIG. 3 is a cross-sectional view of the rotor shown in FIG. 2, as cut perpendicularly along the rotation axis.
Figure 4:
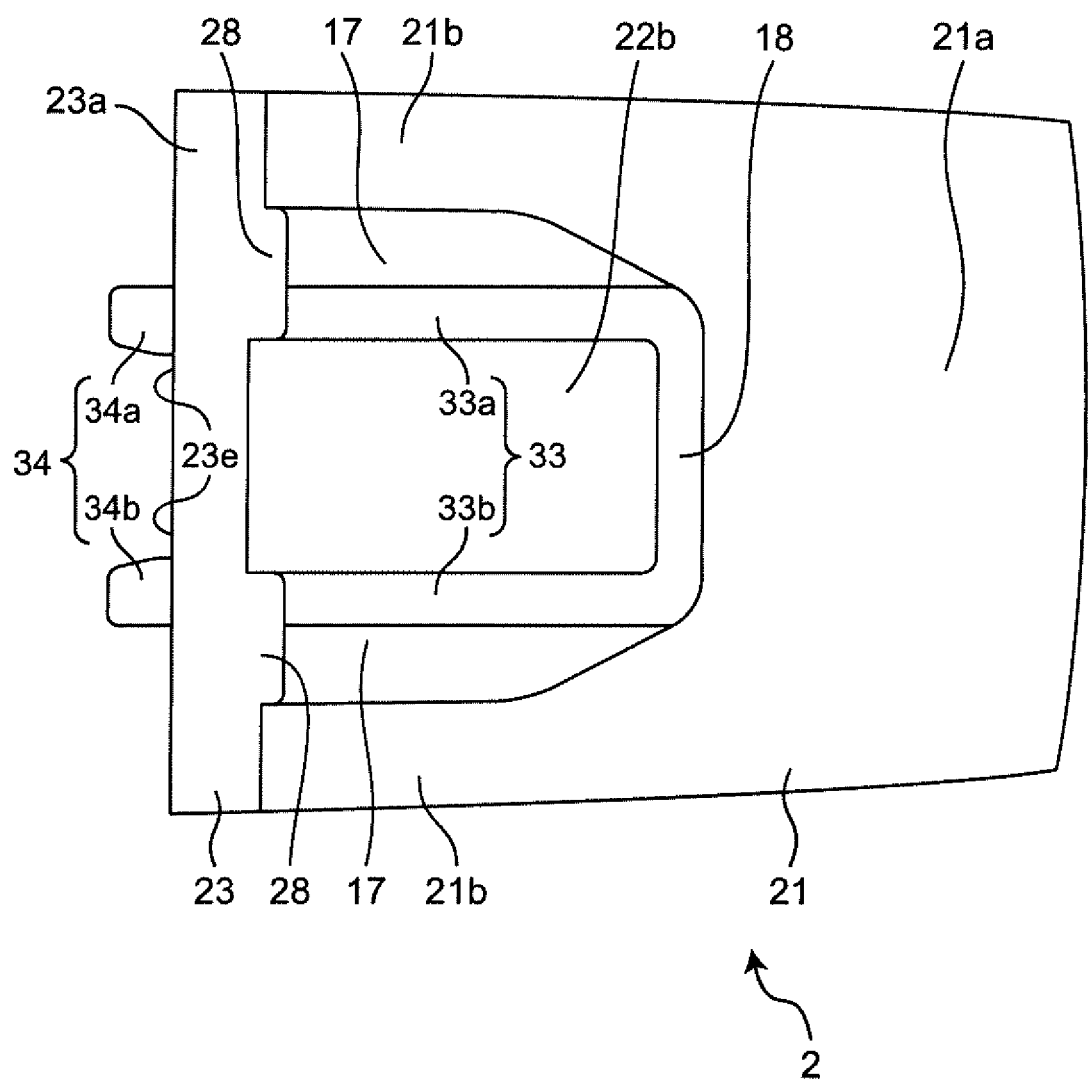
FIG. 4 is a plan view of the rotor shown in FIG. 2.
Figure 5:
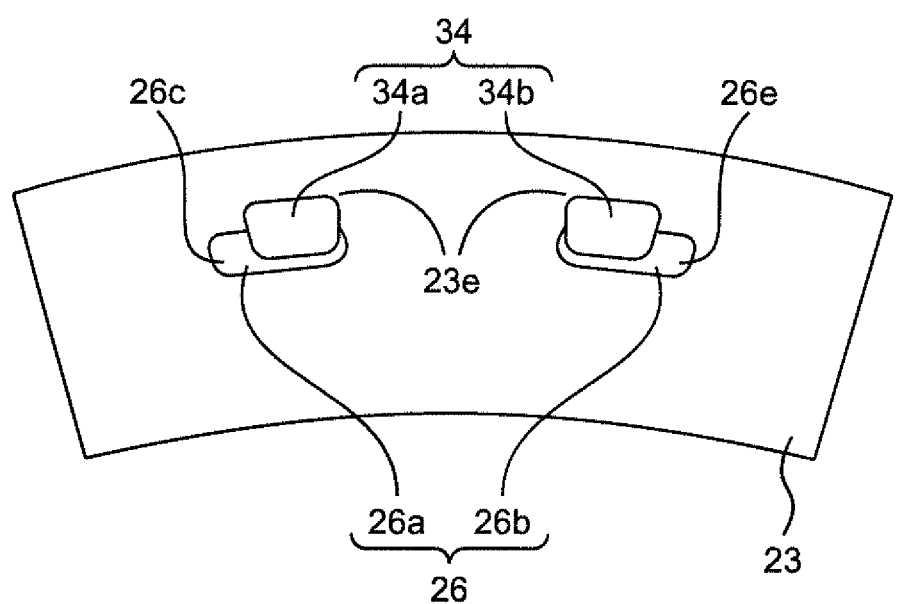
FIG. 5 is a view of the rotor shown in FIG. 2, as seen from the axial direction.

As shown in FIG. 2, FIG. 3, and FIG. 6, an engagement recess portion 38 is formed in the radial gap 16 of one axial side (for example, the side opposite to the magnetic pole holding member 23 or the side of the transmission 9) of the first annular portion 21a and the second annular portion 22a. The engagement recess portion 38 is composed of a first engagement recess portion 38a and a second engagement recess portion 38b. The first engagement recess portion 38a is a recess portion formed by notching the radial inside of the first annular portion 21a. The second engagement recess portion 38b is a recess portion formed by notching the radial outside of the second annular portion 22a.

As shown in FIG. 2, FIG. 3, and FIG. 6, a plurality of permanent magnets 27 are disposed at positions corresponding to the respective claw portions 21b of the first magnetic pole 21. Specifically, the permanent magnet 27 is disposed in the radial gap 16 formed in the same circumferential position as the claw portion 21b of the first magnetic pole 21 and between the inner circumferential surface of the claw portion 21b and the outer circumferential surface of the second annular portion 22a. According to this disposition, magnetic flux by the permanent magnet 27 is formed between the claw portion 21b of the first magnetic pole 21 and the projection portion 22b of the second magnetic pole 22. The permanent magnet 27 has, for example, a rectangular plate shape.

The permanent magnet 27 is a magnet made mainly from neodymium or a magnet made mainly from ferrite. Specifically, various types of permanent magnets such as an SmCo magnet, an AlNiCo magnet, or a neodymium bonded magnet can be used as the permanent magnet 27. The permanent magnet 27 can be disposed on the entire radial gap 16 at the claw portion 21b or a part thereof.

According to this configuration, the output performance of the rotary electric machine 1 can be improved by using magnetic flux by the permanent magnet 27 in addition to magnetic flux by the field coil 7. Further, by sandwiching and holding the permanent magnet 27 between the claw portion 21b and the second annular portion 22a, the strength of the permanent magnet 27 with respect to a centrifugal force acting at the time of rotation can be reinforced, deformation of the permanent magnet 27 due to the centrifugal force can be prevented, and the centrifugal strength at the time of high rotation can be improved.

In the assembled rotor 2, each of the claw portions 21b of the first magnetic pole 21 is disposed in an intermediate portion of the circumferential gap 17 between the adjacent projection portions 22b. Due to this, the claw portion 21b and the projection portion 22b are circumferentially alternately positioned.

In the assembled rotor 2, as shown in FIG. 2 and FIG. 6, a gap for maintaining a non-contact state is formed between the first magnetic pole 21 and the second magnetic pole 22. That is, there is the radial gap 16 in the radial direction between the first annular portion 21a and the second annular portion 22a, there is the circumferential gap 17 in the circumferential direction between the claw portion 21b and the projection portion 22b, and there is an axial gap 18 in the axial direction between the first annular portion 21a and the projection portion 22b. Due to these gaps 16, 17, and 18, the first magnetic pole 21 and the second magnetic pole 22 can maintain a non-contact state in the radial direction, the circumferential direction, and the axial direction, respectively.

The rotor 2 further includes the magnetic pole holding member 23 for fixing while maintaining the non-contact state. As shown in FIG. 3, the magnetic pole holding member 23 is an annular member, and has a base portion 23a, a locking portion 23b, an opening portion 26, and an overhanging portion 28. The magnetic pole holding member 23 is composed of a non-magnetic material such as aluminum or austenitic stainless steel. The locking portion 23b protrudes to one axial side (for example, the transmission 9 side) at the end portion on the outer circumferential side of the base portion 23a, and is locked with respect to the first tip end locking portion 21c of the claw portion 21b. Because of this locking structure, the claw portion 21b supported in a cantilever manner with respect to the first annular portion 21a of the first magnetic pole 21 is radially held by the magnetic pole holding member 23, and it is hence possible to resist the centrifugal force acting at the time of rotation.

The opening portion 26 is formed on the base portion 23a of the magnetic pole holding member 23. The opening portion 26 is an opening penetrating the base portion 23a in the thickness direction. As shown in FIG. 2, the opening portions 26 are disposed at regular intervals, e.g., at equal intervals, in the circumferential direction, and have pairs of one opening portion 26a and the other opening portion 26b. The one opening portion 26a and the other opening portion 26b are formed symmetrically in the circumferential direction across the projection portion 22b. The opening portion 26 is used to provide a snap-fit coupling by an engagement claw portion 34 described later.

Figure 7:
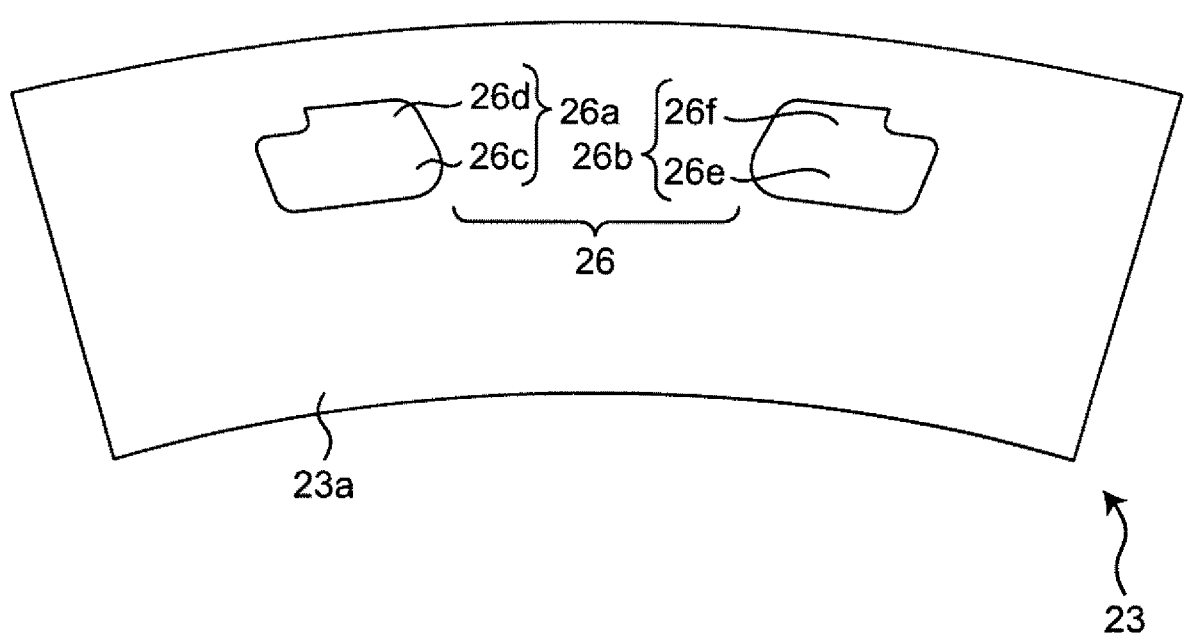
FIG. 7 is a view of the magnetic pole holding member, as seen from the axial direction.

As shown in FIG. 7, the one opening portion 26a has one introduction hole 26c and one engagement hole 26d. The one introduction hole 26c is formed radially inward, and has a circumferential length and a radial width larger than those of the one engagement hole 26d. The one engagement hole 26d is formed radially outward and is formed circumferentially near the projection portion 22b. The one introduction hole 26c is a hole for introducing therethrough a one engagement claw portion 34a of an intervention member 30 described later. The one engagement hole 26d is a hole for receiving therethrough a one leg portion 33a of the intervention member 30 described later and engaging the one engagement claw portion 34a to an engaged surface 23e.

Similarly, the other opening portion 26b has the other introduction hole 26e and the other engagement hole 26f. The other introduction hole 26e is formed radially inward, and has a circumferential length and a radial width larger than those of the other engagement hole 26f. The other engagement hole 26f is formed radially outward and is formed circumferentially near the projection portion 22b. The other introduction hole 26e is a hole for introducing therethrough the other engagement claw portion 34b of the intervention member 30 described later. The other engagement hole 26f is a hole for receiving therethrough the other leg portion 33b of the intervention member 30 to be described later and engaging the other engagement claw portion 34b to the engaged surface 23e.

The magnetic pole holding member 23 has the plurality of overhanging portions 28 arranged in the circumferential gap 17. The overhanging portion 28 extends towards one axial side (for example, the transmission 9 side) from the base portion 23a. The shape and the dimension of the overhanging portion 28 is configured so as to fill the circumferential gap 17.

The overhanging portion 28 of the magnetic pole holding member 23 is disposed in the circumferential gap 17 so as to fill the circumferential gap 17, so that a circumferential phase shift between the first magnetic pole 21 and the second magnetic pole 22 is resolved, and hence torque is reliably transmitted between the first magnetic pole 21 and the second magnetic pole 22.

As shown in FIG. 2, FIG. 3, and FIG. 6, in the rotor 2, the intervention member 30 is arranged in the radial gap 16. The intervention member 30 serves as a gap arrangement member arranged in the radial gap 16 and is composed of a non-magnetic material such as aluminum, austenitic stainless steel, or a resin material.

Figure 8:
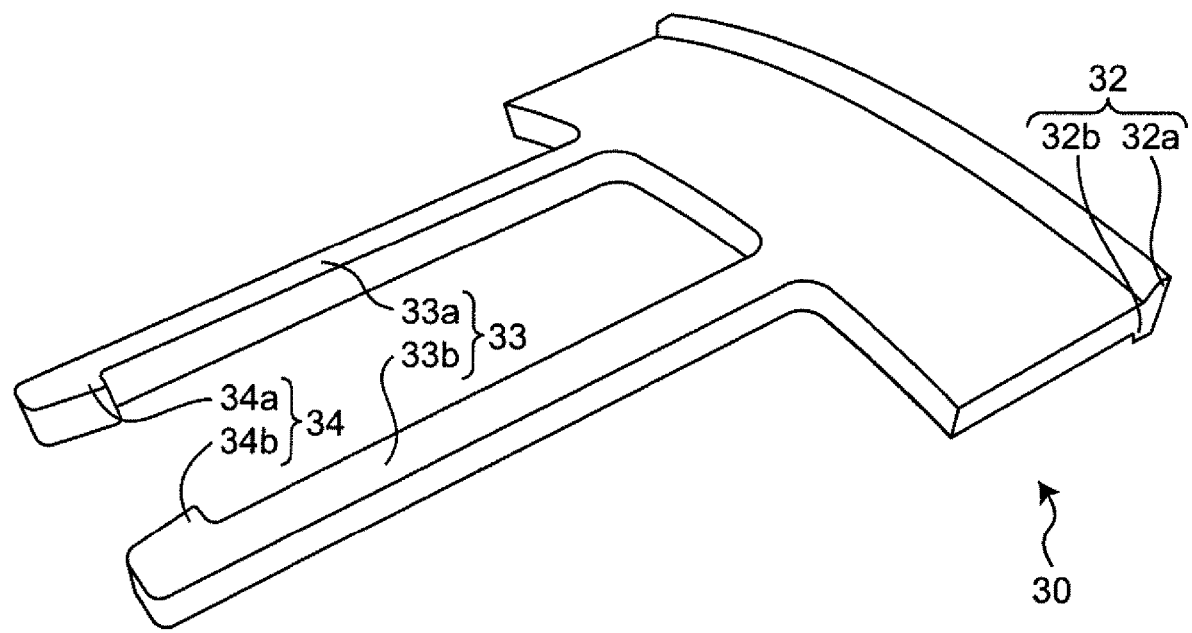
FIG. 8 is a perspective view of an intervention member.

As shown in FIG. 8, the intervention member 30 has an annular base portion 31, an engagement protrusion portion 32, a plurality of leg portions 33, and the plurality of engagement claw portions 34. The annular base portion 31 has an annular shape. The engagement protrusion portion 32 is formed at an end portion on one axial side (for example, the side opposite to the magnetic pole holding member 23 or the side of the transmission 9) of the annular base portion 31, and protrudes in the radial direction. The engagement protrusion portion 32 includes a first engagement protrusion portion 32a protruding radially outward and a second engagement protrusion portion 32b protruding radially inward. The engagement protrusion portion 32 of the intervention member 30 is configured to engage with the engagement recess portion 38 of the radial gap 16. That is, the first engagement protrusion portion 32a and the second engagement protrusion portion 32b are configured to engage with the first engagement recess portion 38a and the second engagement recess portion 38b, respectively.

The leg portion 33 extends from the annular base portion 31 towards the other axial side (for example, the side of the magnetic pole holding member 23 or the side of the engine 8) in the radial gap 16. The leg portions 33 are disposed at regular intervals, e.g., at equal intervals, in the circumferential direction, and are constituted by pairs of the one leg portion 33a and the other leg portion 33b. The leg portion 33 is elastically deformable to provide a snap-fit coupling.

The engagement claw portion 34 is formed at an end portion on the other axial side (for example, the side of the magnetic pole holding member 23 or the side of the engine 8) of the leg portion 33, and has a hook shape protruding towards the projection portion 22b in the circumferential direction. The engagement claw portion 34 includes the one engagement claw portion 34a formed in the one leg portion 33a and the other engagement claw portion 34b formed in the other leg portion 33b. The one leg portion 33a and the one engagement claw portion 34a and the other leg portion 33b and the other engagement claw portion 34b are provided so as to be circumferentially symmetrical across the projection portion 22b. The engagement claw portion 34 of the intervention member 30 is configured to axially engage with the opening portion 26 of the magnetic pole holding member 23. That is, the one engagement claw portion 34a and the other engagement claw portion 34b are configured to axially engage with the one engagement hole 26d and the other engagement hole 26f and the engaged surface 23e, respectively.

On one axial side (for example, the side opposite to the magnetic pole holding member 23 or the side of the transmission 9) of the intervention member 30, the annular base portion 31 is sandwiched in the radial gap 16 between the first annular portion 21a and the second annular portion 22a so that the engagement protrusion portion 32 is axially engaged with the engagement recess portion 38 of the radial gap 16. According to this configuration, on one axial side of the intervention member 30, axial positioning and fixing are performed by engagement of the engagement protrusion portion 32 with respect to the engagement recess portion 38, and hence the engagement protrusion portion 32 serves as an axial positioning portion.

The one engagement claw portion 34a and the other engagement claw portion 34b are introduced into the one introduction hole 26c and the other introduction hole 26e, respectively. Thereafter, by elastically deforming the one leg portion 33a and the other leg portion 33b radially outwardly, the one engagement claw portion 34a and the other engagement claw portion 34b engage with the one engagement hole 26d and the other engagement hole 26f, respectively, and engage with the engaged surface 23e. Accordingly, by fitting the engagement claw portion 34 to the one engagement hole 26d and the other engagement hole 26f of the opening portion 26, the intervention member 30 is fixed to the magnetic pole holding member 23 by a snap-fit coupling. According to this configuration, since axial positioning is performed by the axial engagement at the other axial side of the one engagement claw portion 34a and the other engagement claw portion 34b, the one engagement claw portion 34a and the other engagement claw portion 34b serve as axial positioning portions. Axial positioning can be simply and easily achieved by the engagement protrusion portion 32 engaging with the engagement recess portion 38 and the engagement claw portion 34 engaging with the engaged surface 23e. Further, the snap-fit coupling allows the intervention member 30 to be easily and reliably fixed to the magnetic pole holding member 23.

In this manner, the intervention member 30 is provided with the engagement protrusion portion 32 on one axial side and the engagement claw portion 34 on the other axial side, and hence axial positioning of the first magnetic pole and the second magnetic pole can be simply and easily performed.

The first magnetic pole 21 and the second magnetic pole 22 are radially held in a non-contact state via the annular base portion 31 of the intervention member 30 arranged in the radial gap 16. Since the annular base portion 31 of the intervention member 30, the first annular portion 21a of the first magnetic pole 21, and the second annular portion 22a of the second magnetic pole 22 have the same central axis (i.e., they are coaxial), radial positioning (so-called centering) of the first magnetic pole and the second magnetic pole can be simply and easily performed.

In the rotor 2 of the rotary electric machine 1 according to this invention, it is possible to simply and easily perform radial positioning (so-called centering) of the first magnetic pole 21 and the second magnetic pole 22 by the intervention member 30 arranged in the radial gap 16, and axial positioning is performed by the axial positioning portion of the intervention member 30, that is, the engagement protrusion portion 32 and the engagement claw portion 34. Accordingly, by the intervention member 30 providing the plurality of functions, the structure in which the first magnetic pole 21 and the second magnetic pole 22 are positioned while being maintained in a non-contact state radially and axially can be simply and easily achieved.

Variation of First Embodiment

Figure 9:
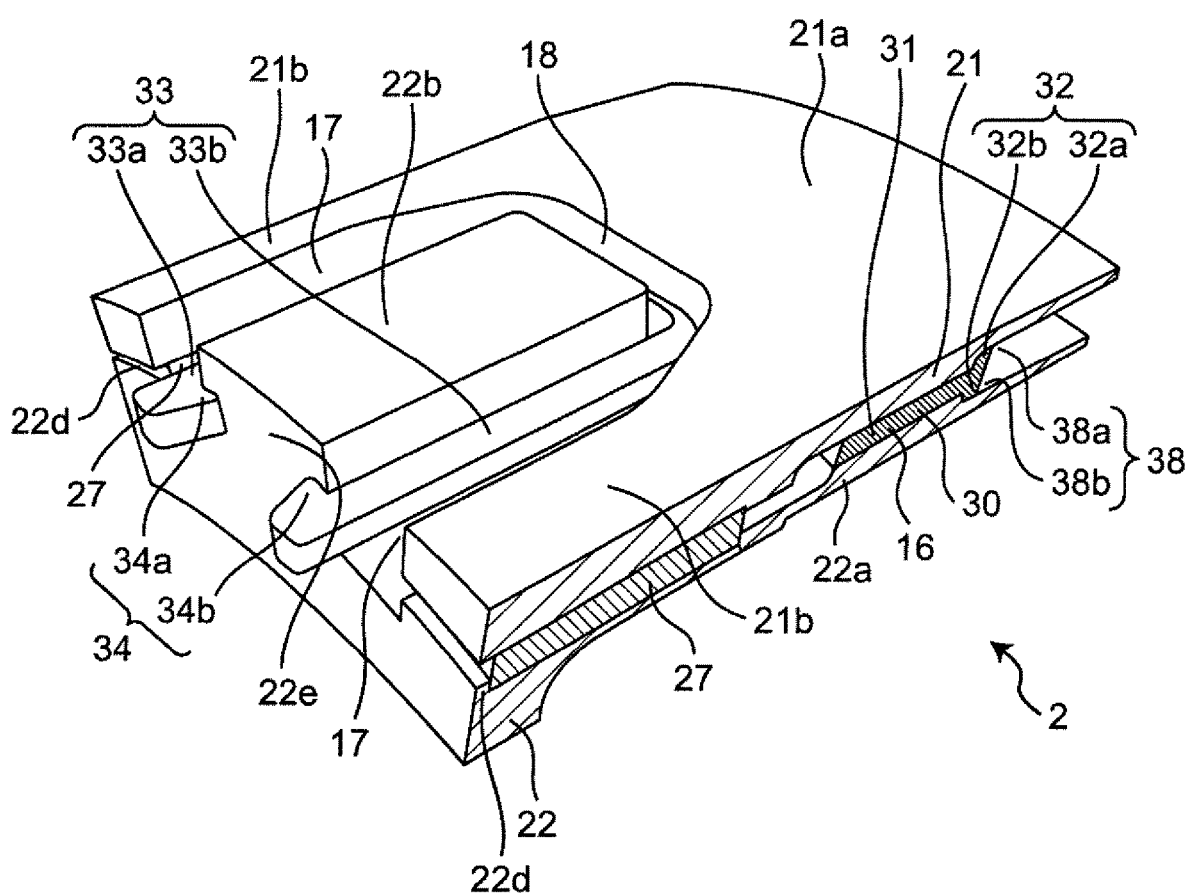
FIG. 9 is a perspective view of a rotor of a rotary electric machine according to a variation of the first embodiment, as cut vertically along the rotation axis.

A variation of the rotary electric machine 1 according to the first embodiment will be described with reference to FIG. 9. FIG. 9 is a perspective view of the rotor 2 of the rotary electric machine 1 according to the variation, as cut vertically along the rotation axis 10. In the variation shown in FIG. 9, in comparison with the rotor 2 shown in FIG. 2, the engagement claw portion 34 of the intervention member 30 is engaged with the engaged surface 22e of the projection portion 22b.

As well as the embodiment shown in FIG. 2, the intervention member 30 shown in FIG. 9 is arranged in the radial gap 16, and includes the annular base portion 31, the engagement protrusion portion 32, the leg portions 33 (the one leg portion 33a and the other leg portion 33b), and the engagement claw portions 34 (the one engagement claw portion 34a and the other engagement claw portion 34b). The projection portion 22b has the engaged surface 22e on the other axial side (for example, the side facing the magnetic pole holding member 23 or the side of the engine 8).

The engagement protrusion portion 32 radially protruding is formed at the end portion on one axial side (for example, the side opposite to the magnetic pole holding member 23 or the side of the transmission 9) of the annular base portion 31. The engagement protrusion portion 32 is configured to axially engage with the engagement recess portion 38 of the radial gap 16. The engagement protrusion portion 32 serves as the axial positioning portion.

At the other axial end (for example, the side of the magnetic pole holding member 23 or the side of the engine 8) of the leg portion 33, the engagement claw portions 34 (the one engagement claw portion 34a and the other engagement claw portion 34b) having a hook shape protruding towards the projection portion 22b in the circumferential direction are formed. The leg portions 33 (the one leg portion 33a and the other leg portion 33b) circumferentially and elastically deform towards the projection portion 22b, so that the engagement claw portions 34 (the one engagement claw portion 34a and the other engagement claw portion 34b) are configured to axially engage with the engaged surface 22e of the projection portion 22b. The engagement claw portion 34 of the intervention member 30 is fixed to the projection portion 22b by a snap-fit coupling. In this way, the one engagement claw portion 34a and the other engagement claw portion 34b serve as axial positioning portions. Accordingly, axial positioning can be simply and easily achieved by the engagement protrusion portion 32 engaging with the engagement recess portion 38 and the engagement claw portion 34 engaging with the engaged surface 22e.

In the rotor 2 of the rotary electric machine 1 according to this variation, it is possible to simply and easily perform radial positioning (so-called centering) of the first magnetic pole 21 and the second magnetic pole 22 by the intervention member 30 arranged in the radial gap 16, and axial positioning is performed by the axial positioning portion of the intervention member 30, that is, the engagement protrusion portion 32 and the engagement claw portion 34. Accordingly, by the intervention member 30 providing the plurality of functions, the structure in which the first magnetic pole 21 and the second magnetic pole 22 are positioned while being maintained in a non-contact state radially and axially can be simply and easily achieved.

In the rotor 2 of the rotary electric machine 1 according to the variation, the plurality of permanent magnets 27 are axially locked by a magnet locking portion 22d of the second magnetic pole 22. That is, the magnet locking portion 22d radially and outwardly protrudes at the end portion on the other axial side (for example, the side of the magnetic pole holding member 23 or the side of the engine 8) of the second annular portion 22a of the second magnetic pole 22. The radial gap 16 at the end portion on the other axial side is narrowed in the radial direction by the magnet locking portion 22d. Due to this, it is possible to axially fix the permanent magnet 27 arranged in the radial gap 16.

Another Variation of First Embodiment

Figure 10:
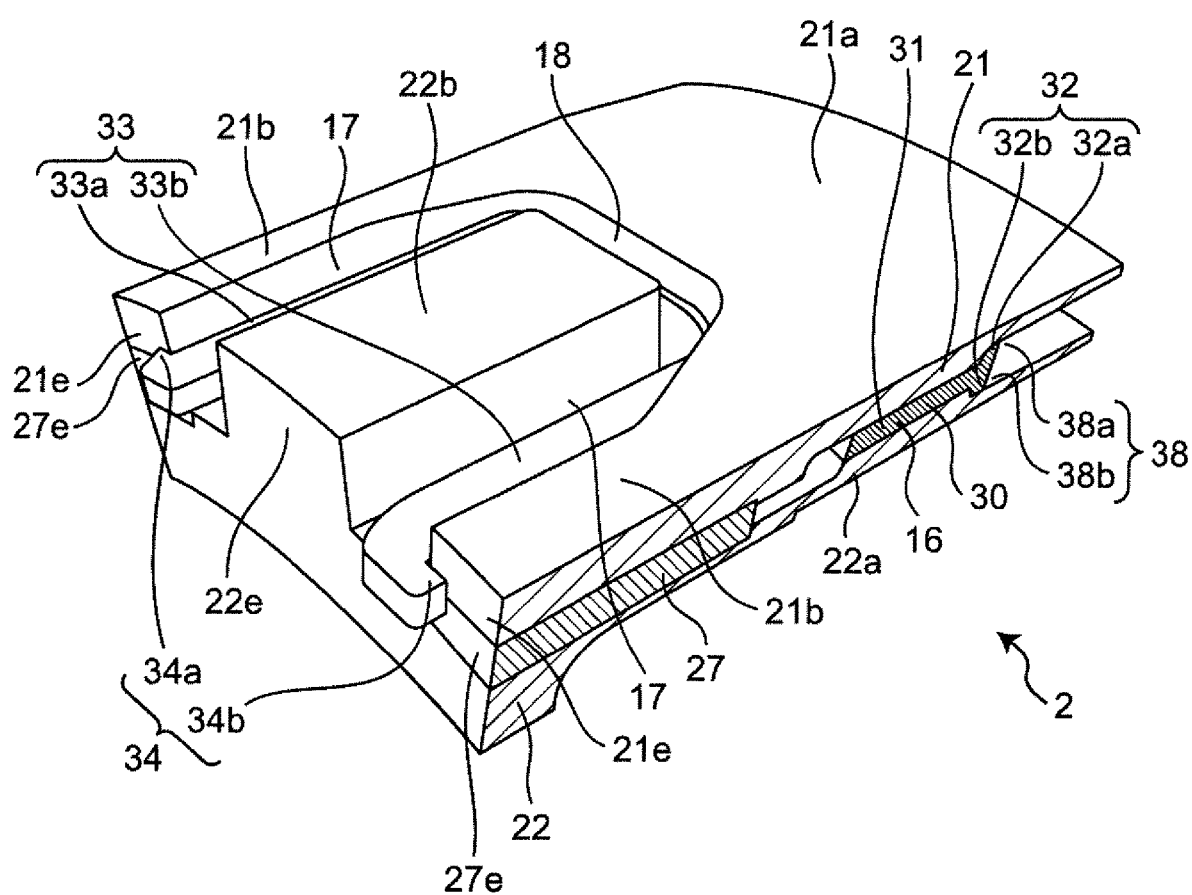
FIG. 10 is a perspective view of a rotor of a rotary electric machine according to another variation of the first embodiment, as cut vertically along the rotation axis.

Another variation of the rotary electric machine 1 according to the first embodiment will be described with reference to FIG. 10. FIG. 10 is a perspective view of the rotor 2 of the rotary electric machine 1 according to another variation, as cut vertically along the rotation axis 10. In another variation shown in FIG. 10, in comparison with the rotor 2 shown in FIG. 2, the engagement claw portion 34 of the intervention member 30 is engaged with both the claw portion 21b of the first magnetic pole 21 and the permanent magnet 27 on the other axial side (for example, the side facing the magnetic pole holding member 23 or on the side of the engine 8). It is to be noted that the engagement claw portion 34 of the intervention member 30 does not necessarily need to engage with both the claw portion 21b of the first magnetic pole 21 and the permanent magnet 27, and it may engage with only the permanent magnet 27, for example.

The intervention member 30 shown in FIG. 10, arranged in the radial gap 16, has the annular base portion 31, the engagement protrusion portion 32, the leg portions 33 (the one leg portion 33a and the other leg portion 33b), and the engagement claw portions 34 (the one engagement claw portion 34a and the other engagement claw portion 34b). The one engagement claw portion 34a and the other engagement claw portion 34b have a hook shape extending to the opposite side of the projection portion 22b in the circumferential direction.

The claw portion 21b has the engaged surface 21e on the other axial side. The permanent magnet 27 also has an engaged surface 27e on the other axial side. The engaged surface 21e and the engaged surface 27e are configured to be flush with each other when the permanent magnet 27 is arranged in the radial gap 16.

The leg portions 33 (the one leg portion 33a and the other leg portion 33b) circumferentially and elastically deform towards the opposite side of the projection portion 22b, so that the engagement claw portions 34 (the one engagement claw portion 34a and the other engagement claw portion 34b) axially engage with both the engaged surface 21e of the claw portion 21b and the engaged surface 27e of the permanent magnet 27. As a result, the intervention member 30 is fixed to the claw portion 21b and the permanent magnet 27 by a snap-fit coupling. Since the engagement claw portion 34 serves as the axial positioning portion, axial positioning can be simply and easily achieved by the engagement protrusion portion 32 engaging with the engagement recess portion 38 and the engagement claw portion 34 engaging with both the claw portion 21b and the permanent magnet 27. The engagement claw portion 34 can axially fix the permanent magnet 27 arranged in the radial gap 16.

Second Embodiment

Next, the configuration of the rotor 2 of the rotary electric machine 1 according to the second embodiment will be described in detail with reference to FIG. 11 to FIG. 16.

Figure 11:
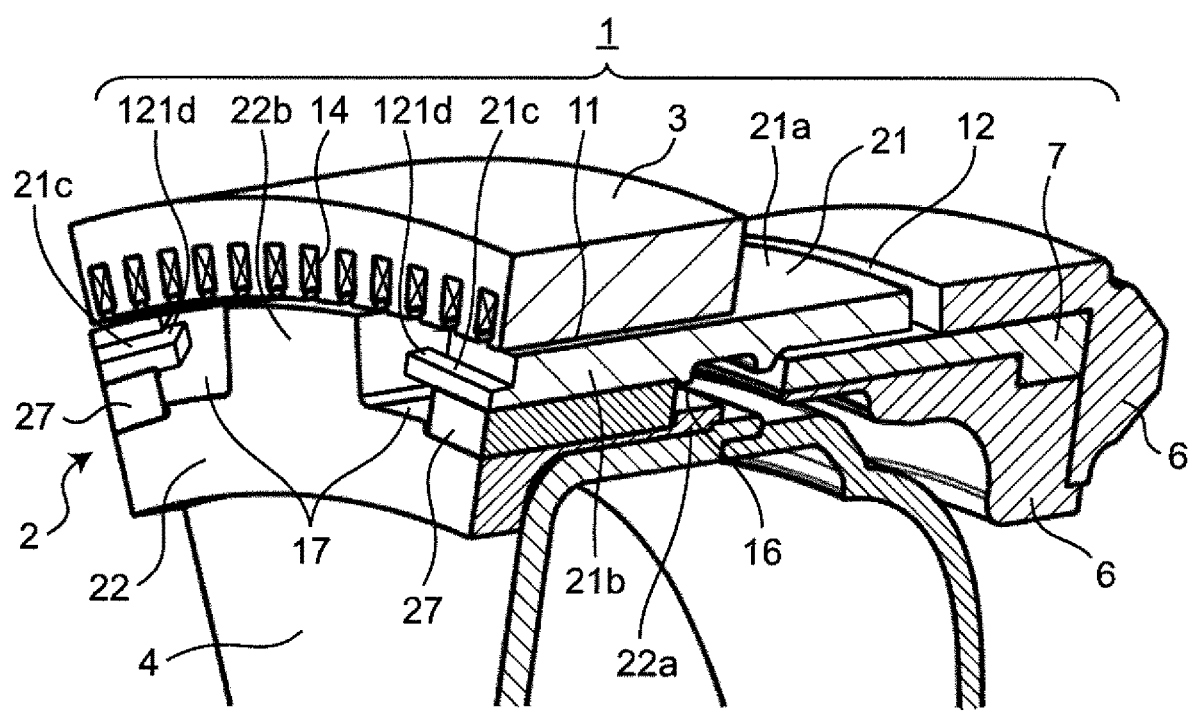
FIG. 11 is a perspective view of a rotary electric machine according to a second embodiment of this invention, as cut vertically along the rotation axis.
Figure 12:
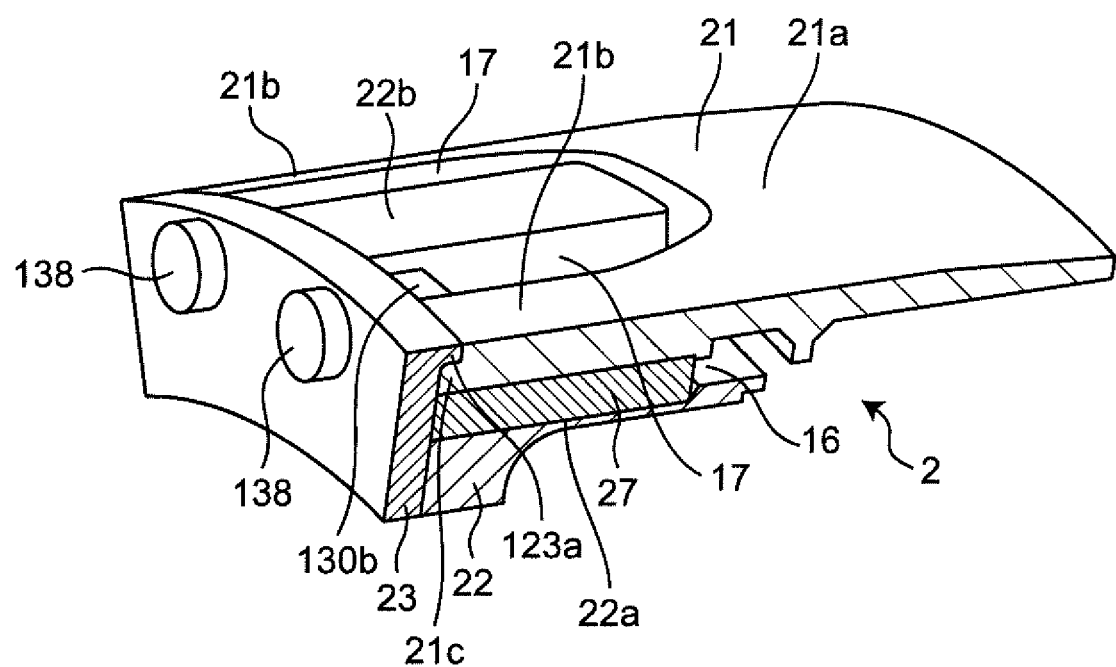
FIG. 12 is a perspective view of a rotor of a rotary electric machine, as cut vertically along the rotation axis.

As shown in FIG. 11 and FIG. 12, the rotor 2 is a claw pole type, and includes the first magnetic pole 21, the second magnetic pole 22, and a magnetic pole holding member 23.

The first magnetic pole 21 has a first annular portion 21a and a plurality of claw portions 21b, and is composed of, for example, a soft magnetic material such as iron. The claw portion 21b extends in the axial direction of the rotation axis 10 from the first annular portion 21a. The claw portion 21b has, for example, a rectangular thin plate shape. The claw portions 21b are disposed at regular intervals, e.g., at equal intervals, in the circumferential direction, and the axial lengths of the claw portions 21b are all the same. The outer circumferential surface of each of the claw portions 21b extends on the same circumference as the outer circumferential surface of the first annular portion 21a. The claw portion 21b is configured to be in a non-contact state with respect to the second magnetic pole 22 and to have the radial gap 16 in the radial direction when the first magnetic pole 21 and the second magnetic pole 22 are combined.

Each of the claw portions 21b extends to the end edge of the engine 8 side of the first annular portion 21a, thereby forming the first tip end locking portion 21c. The first tip end locking portion 21c is a stepped portion formed by notching the outer circumferential end edge of the claw portion 21b. The outer circumferential surface of each of the first tip end locking portions 21c is positioned on the same circumference about the axial center of the rotation axis 10.

The second magnetic pole 22 has a second annular portion 22a and a plurality of projection portions 22b, and is composed of, for example, a soft magnetic material such as iron. The second annular portion 22a is disposed so as to partially overlap with the claw portion 21b as viewed from the radial direction through the radial gap 16 inside the claw portion 21b. The projection portion 22b radially protrudes on the outer circumferential surface of the second annular portion 22a. The projection portions 22b are disposed with the circumferential gap 17 in the circumferential direction with respect to the claw portions 21b. The projection portion 22b has, for example, a rectangular plate shape. The projection portions 22b are also disposed at regular intervals, e.g., at equal intervals, in the circumferential direction, and the radial heights of the projection portions 22b are all the same. The axial lengths of the projection portions 22b are all the same and are shorter than the axial lengths of the claw portions 21b.

The outer circumferential surface of each of the projection portions 22b is positioned on the same outer circumference with respect to the outer circumferential surface of each of the claw portions 21b about the axial center of the rotation axis 10. Each of the projection portions 22b extends to an end edge of the engine 8 side of the second annular portion 22a, thereby forming a second tip end locking portion 122c. The second tip end locking portion 122c is a stepped portion formed by notching the outer circumferential end edge of the projection portion 22b. The outer circumferential surface of each of the second tip end locking portions 122c is positioned on the same circumference with respect to the outer circumferential surface of each of the first tip end locking portions 21c about the axial center of the rotation axis 10. Accordingly, the outer circumferential surface of each of the first tip end locking portions 21c and the outer circumferential surface of each of the second tip end locking portions 122c are positioned on the same circumference about the axial center of the rotation axis 10. According to this configuration, since the outer circumferential surface of the first tip end locking portion 21c and the outer circumferential surface of each of the second tip end locking portions 122c are positioned on the same outer circumference, it is easy to fit the first tip end locking portion 21c and each of the second tip end locking portions 122c with a fitting portion 123a, which will be described later, of the magnetic pole holding member 23.

Figure 13:
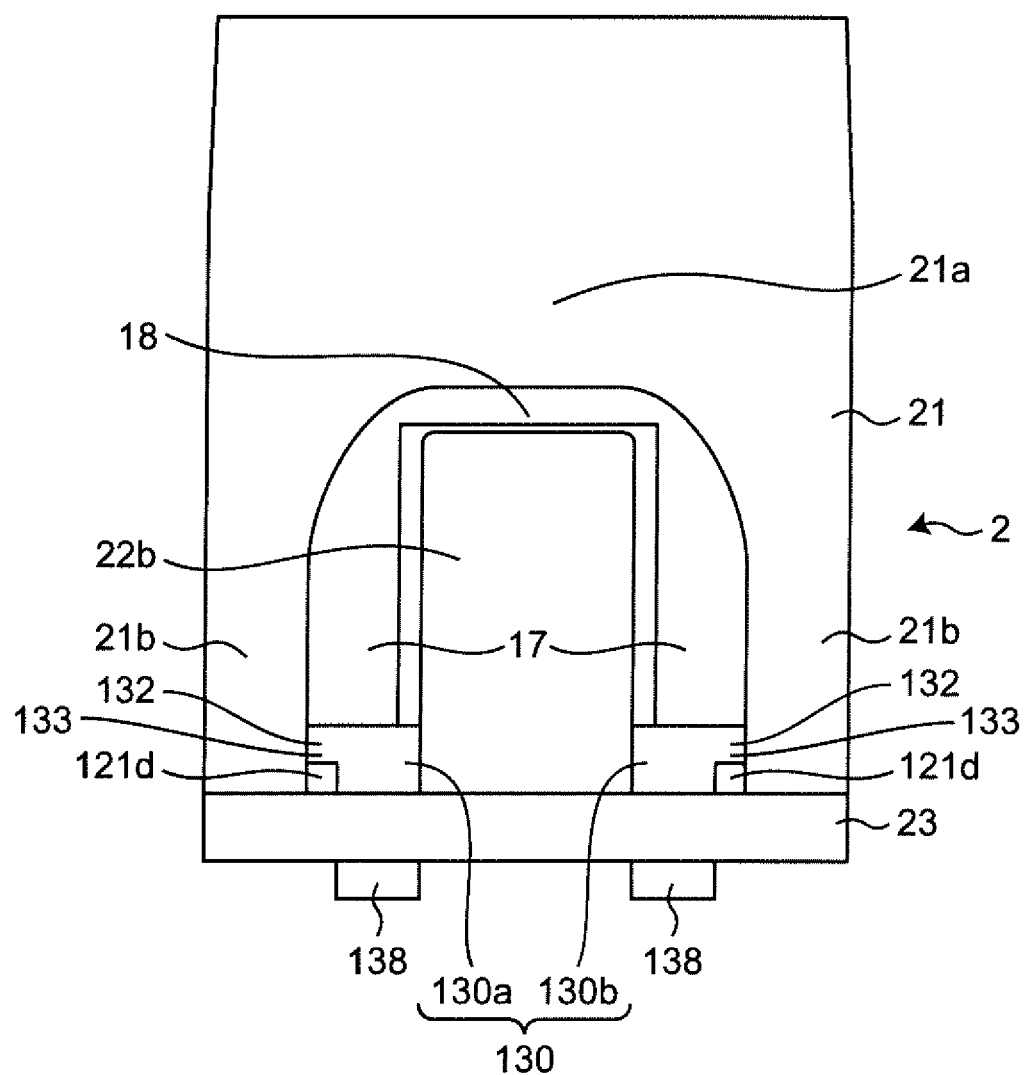
FIG. 13 is a plan view of the rotor shown in FIG. 12.
Figure 15:
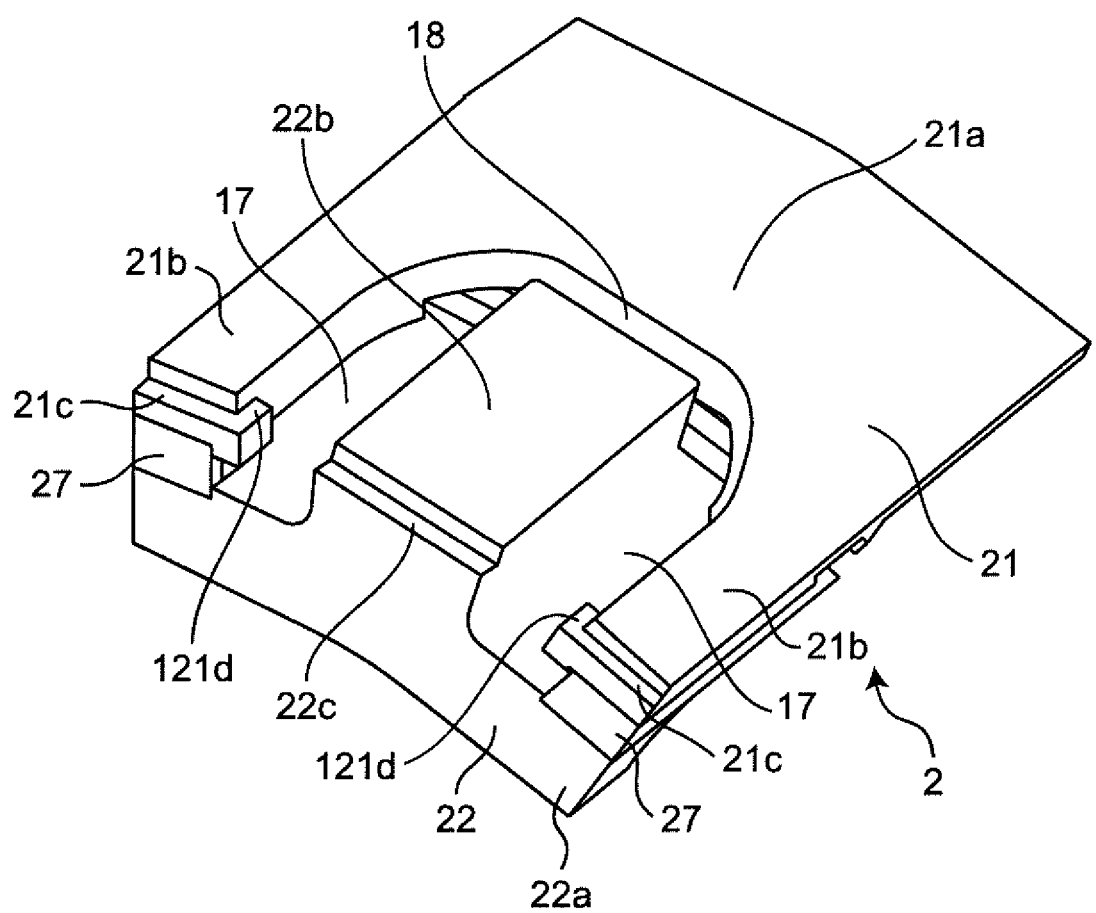
FIG. 15 is a perspective view of the rotor shown in FIG. 14 with a spacer member removed therefrom.

The surface on the side facing the projection portion 22b of each of the claw portions 21b is provided with an engagement projection portion 121d. The engagement projection portion 121d circumferentially protrudes towards the projection portion 22b. The engagement projection portion 121d has a rectangular shape in plan view as shown in FIG. 13, and has a rectangular shape as seen from the axial direction as shown in FIG. 15. The outer circumferential surface of the engagement projection portion 121d is positioned on the same circumference as the outer circumferential surface of the first tip end locking portion 21c of the claw portion 21b. The engagement projection portion 121d of the claw portion 21b engages with an axial engagement portion 132 of a spacer member 130.

As shown in FIG. 11, FIG. 12, FIG. 14, and FIG. 15, the plurality of permanent magnets 27 are disposed in positions corresponding to the respective claw portions 21b of the first magnetic pole 21. Specifically, the permanent magnet 27 is disposed in the radial gap 16 in the same circumferential position as the claw portion 21b of the first magnetic pole 21 and between the inner circumferential surface of the claw portion 21b and the outer circumferential surface of the second annular portion 22a. According to this disposition, magnetic flux by the permanent magnet 27 is formed between the claw portion 21b of the first magnetic pole 21 and the projection portion 22b of the second magnetic pole 22. The permanent magnet 27 has, for example, a rectangular plate shape.

The permanent magnet 27 is a magnet made mainly from neodymium or a magnet made mainly from ferrite. Specifically, various types of permanent magnets such as an SmCo magnet, an AlNiCo magnet, or a neodymium bonded magnet can be used as the permanent magnet 27. The permanent magnet 27 can be disposed on the entire radial gap 16 at the claw portion 21b or a part thereof.

According to this configuration, the output performance of the rotary electric machine 1 can be improved by using magnetic flux by the permanent magnet 27 in addition to magnetic flux by the field coil 7. Further, by sandwiching and holding the permanent magnet 27 with the claw portion 21b and the second annular portion 22a, the strength of the permanent magnet 27 with respect to the centrifugal force can be reinforced, deformation of the permanent magnet 27 due to the centrifugal force can be prevented, and the centrifugal strength at the time of high rotation can be improved.

The rotor 2 is assembled as follows. By axially moving the first magnetic pole 21 with respect to the second magnetic pole 22, each of the claw portions 21b of the first magnetic pole 21 is inserted in the intermediate portion of the circumferential gap 17 between the adjacent projection portions 22b. Thereby, the claw portion 21b and the projection portion 22b are assembled in a state of being circumferentially alternately disposed. It is configured that in the assembled state, the outer circumferential surface of each of the first tip end locking portions 21c and the outer circumferential surface of each of the second tip end locking portions 122c are positioned on the same circumference about the axial center of the rotation axis 10.

Figure 14:
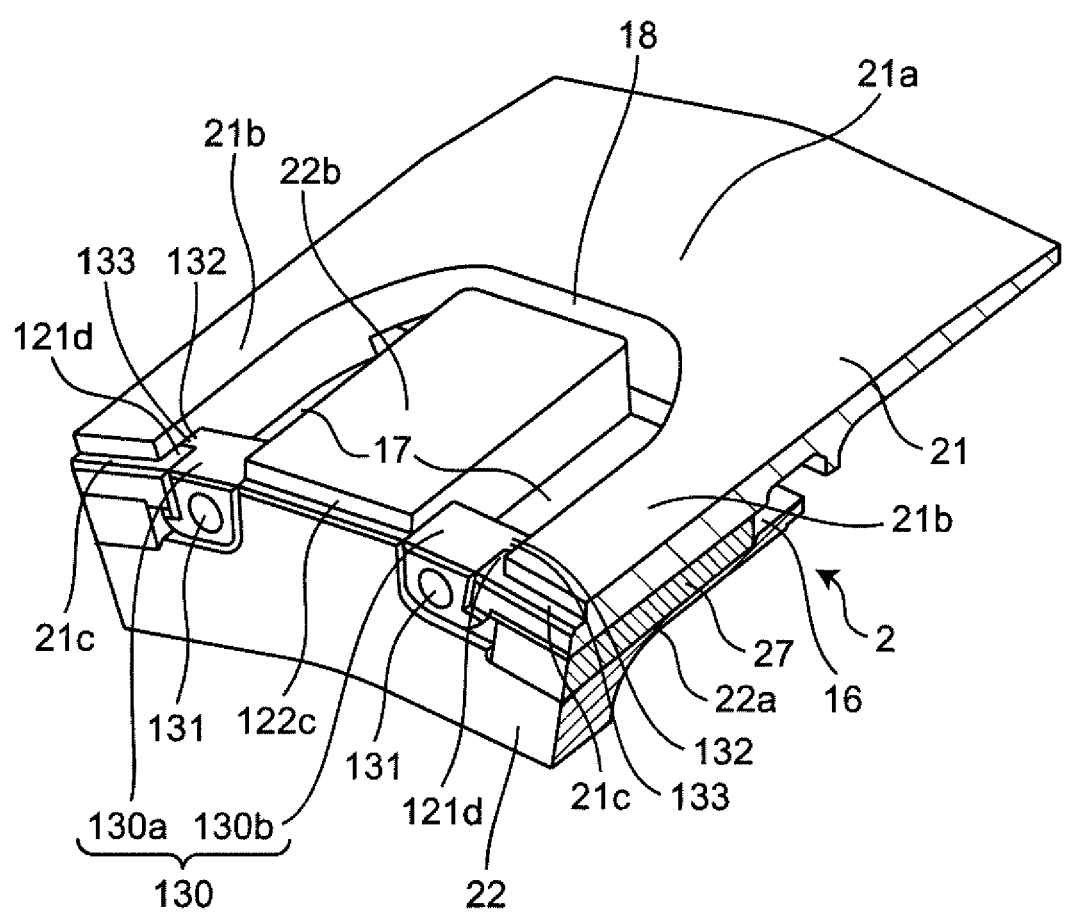
FIG. 14 is a perspective view of the rotor shown in FIG. 12 with a magnetic pole holding member removed therefrom.

In the assembled state, as shown in FIG. 14, a gap for maintaining a non-contact state is formed between the first magnetic pole 21 and the second magnetic pole 22. That is, there is the radial gap 16 in the radial direction between the claw portion 21b and the second annular portion 22a, there is the circumferential gap 17 in the circumferential direction between the claw portion 21b and the projection portion 22b, and there is the axial gap 18 in the axial direction between the first annular portion 21a and the projection portion 22b. Therefore, the first magnetic pole 21 and the second magnetic pole 22 maintain a non-contact state in the radial direction, the circumferential direction, and the axial direction.

The rotor 2 further includes the magnetic pole holding member 23 for fixing while maintaining the non-contact state. As shown in FIG. 13, the magnetic pole holding member 23 is an annular member, and has the fitting portion 123a at an end portion on the outer circumferential side. The magnetic pole holding member 23 is composed of a non-magnetic material such as aluminum or austenitic stainless steel. The fitting portion 123a protrudes on the transmission 9 side, for example, and is fitted with the first tip end locking portion 21c of the claw portion 21b of the first magnetic pole 21 and the second tip end locking portion 122c of the projection portion 22b of the second magnetic pole 22. With this fitting structure, the first magnetic pole 21 and the second magnetic pole 22 are fixedly held with respect to the radial direction by the magnetic pole holding member 23. Further, the magnetic pole holding member 23 has a through hole (not illustrated) for bolting by a bolt 138 described later.

Figure 16:
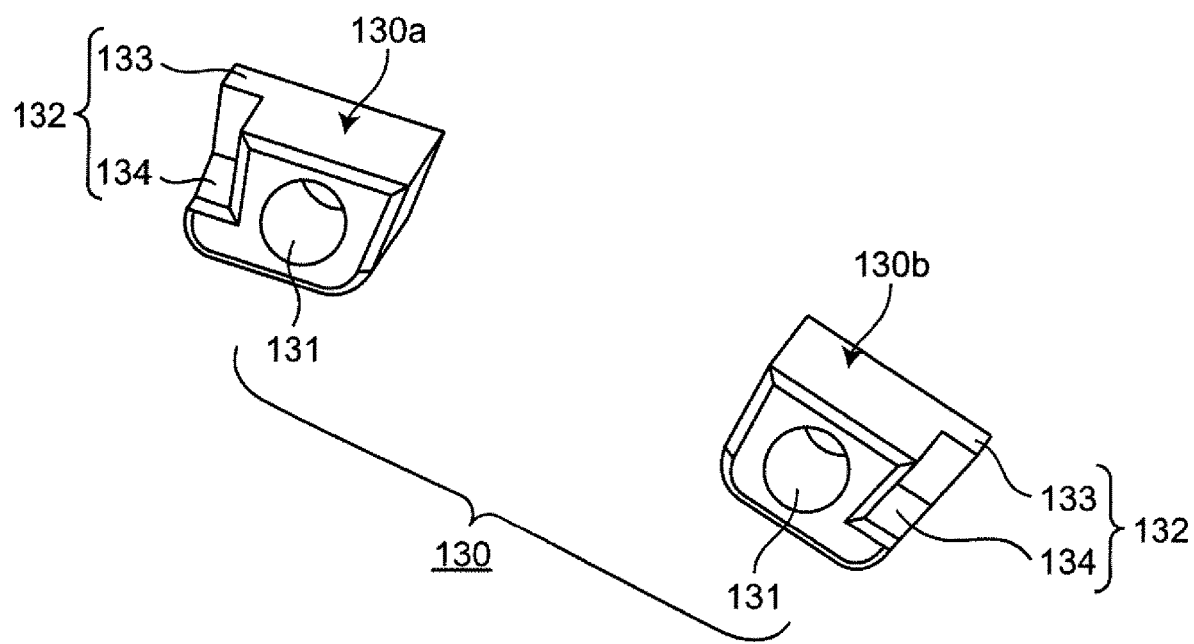
FIG. 16 is a perspective view of the spacer member.

As shown in FIG. 13, FIG. 14, and FIG. 16, the rotor 2 further includes the spacer member 130 for filling the circumferential gap 17.

As shown in FIG. 16, the spacer member 130 is composed of a pair of rectangular parallelepiped members that are a one spacer member 130a and an other spacer member 130b.

The one spacer member 130a and the other spacer member 130b are configured to be circumferentially symmetrical. Hereinafter, the one spacer member 130a and the other spacer member 130b are simply referred to as the spacer member 130.

The spacer member 130 has an axially extending screw bore 131 and the axial engagement portion 132. The spacer member 130 serves as a gap arrangement member arranged in the circumferential gap 17 and is composed of a non-magnetic material such as aluminum or austenitic stainless steel. The axial engagement portion 132 is provided on the side facing the claw portion 21b of the first magnetic pole 21. The axial engagement portion 132 has an engagement end portion 133 and an engagement recess portion 134 and is formed by partially notching a corner portion facing both the claw portion 21b and the magnetic pole holding member 23.

The engagement end portion 133 and the engagement recess portion 134 are axially aligned. The engagement end portion 133 is, for example, a plate-like portion positioned on the transmission 9 side, and axially engages with the engagement projection portion 121d of the claw portion 21b. The engagement recess portion 134 is, for example, a recess portion positioned on the engine 8 side, and receives the engagement projection portion 121d of the claw portion 21b.

As shown in FIG. 13 and FIG. 14, the spacer member 130 is disposed between the claw portion 21b of the first magnetic pole 21 and the projection portion 22b of the second magnetic pole 22 so as to fill the circumferential gap 17. At this time, the surface on the side facing the projection portion 22b of the spacer member 130 abuts against the projection portion 22b, and the surface on the side facing the claw portion 21b of the engagement end portion 133 of the spacer member 130 abuts against the claw portion 21b, and hence the circumferential gap 17 is substantially filled with the spacer member 130. The engagement recess portion 134 of the spacer member 130 receives the engagement projection portion 121d of the claw portion 21b and the engagement end portion 133 abuts against the surface (the surface of the transmission 9 side, for instance) of the side not facing the magnetic pole holding member 23 of the claw portion 21b, so that the axial engagement portion 132 axially engages with the engagement projection portion 121d.

In the rotor 2 of the rotary electric machine 1 according to the present invention, the spacer member 130 is fixedly held with respect to the radial direction by being fitted with the magnetic pole holding member 23 in a state of being disposed between the claw portion 21b of the first magnetic pole 21 and the projection portion 22b of the second magnetic pole 22 so as to fill the circumferential gap 17. That is, the magnetic pole holding member 23 is axially mounted with respect to the first magnetic pole 21 and the second magnetic pole 22 in a state where the spacer member 130 is disposed between the claw portion 21b and the projection portion 22b. At this time, the fitting portion 123a of the magnetic pole holding member 23 is fitted with the first tip end locking portion 21c of the claw portion 21b of the first magnetic pole 21 and the second tip end locking portion 122c of the projection portion 22b of the second magnetic pole 22.

Then, by screwing a screw portion of the bolt 138 into the screw bore 131 of the spacer member 130, the spacer member 130 is fixed (i.e., bolted) to the magnetic pole holding member 23 with the bolt 138. This bolting allows the spacer member 130 to be easily and reliably fixed to the magnetic pole holding member 23. When the spacer member 130 is bolted to the magnetic pole holding member 23, the engagement end portion 133 of the spacer member 130 is drawn towards the magnetic pole holding member 23 side and axially engaged with the engagement projection portion 121d of the claw portion 21b, and hence the first magnetic pole 21 is axially held and fixed to the magnetic pole holding member 23. Further, the second magnetic pole 22 can be fixed to the magnetic pole holding member 23 by an arbitrary fixing method described later.

The spacer member 130 is disposed between the claw portion 21b of the first magnetic pole 21 and the projection portion 22b of the second magnetic pole 22 so as to fill the circumferential gap 17, thereby circumferentially holding the first magnetic pole 21 and the second magnetic pole 22. As a result, the circumferential phase shift between the first magnetic pole 21 and the second magnetic pole 22 is resolved, and thus torque is reliably transmitted between the first magnetic pole 21 and the second magnetic pole 22.

According to the above configuration, in addition that the first magnetic pole 21 and the second magnetic pole 22 are radially held by the magnetic pole holding member 23, the torque is circumferentially reliably transmitted between the first magnetic pole 21 and the second magnetic pole 22 by the spacer member 130 filling the circumferential gap 17, and the spacer member 130 is axially engaged with the claw portion 21b of the first magnetic pole 21, thereby axial holding the first magnetic pole 21. Accordingly, by the spacer member 130 providing the plurality of functions, the structure in which the first magnetic pole 21 and the second magnetic pole 22 are fixed to the magnetic pole holding member 23 while being maintained in a non-contact state radially, circumferentially, and axially can be easily achieved.

Figure 17:
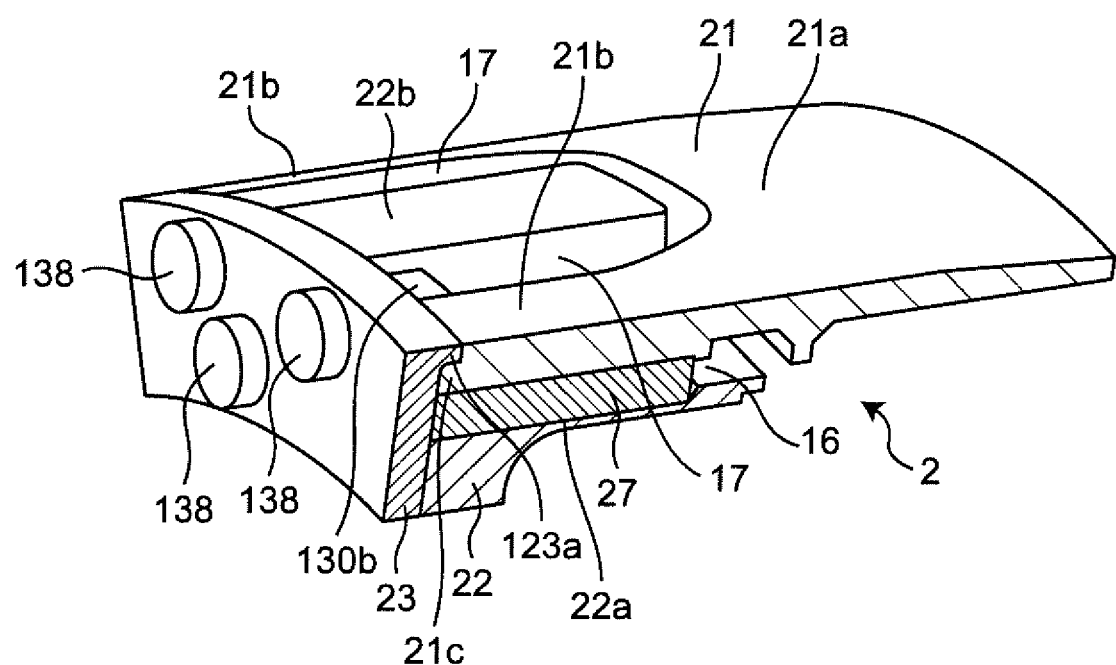
FIG. 17 is a perspective view of a rotor according to a variation of the second embodiment, as cut vertically along the rotation axis.

A variation of the second embodiment will be described with reference to FIG. 17. FIG. 17 is a perspective view of the rotor 2 according to a variation of the second embodiment, as cut vertically along the rotation axis 10. In the variation shown in FIG. 17, in comparison with the rotary electric machine 1 shown in FIG. 12, the bolt 138 for fixing the second magnetic pole 22 to the magnetic pole holding member 23 is provided.

An unillustrated screw bore is formed in the second magnetic pole 22, and a through hole corresponding to the screw bore is formed in the magnetic pole holding member 23. While the screw bore of the second magnetic pole 22 is formed in the second annular portion 22a on the radial inside of each of the projection portions 22b as shown in FIG. 17 for example, it is not limited to this position.

By screwing the screw portion of the bolt 138 into the screw bore of the second magnetic pole 22, the second magnetic pole 22 is fixed (i.e., bolted) to the magnetic pole holding member 23 with the bolt 138. This bolting allows the second magnetic pole 22 to be easily and reliably fixed to the magnetic pole holding member 23. Accordingly, the first magnetic pole 21 and the second magnetic pole 22 can be easily and reliably fixed to the magnetic pole holding member 23.

While the specific embodiments of the present invention have been described, the present invention is not limited to the embodiments described above and various variations can be made within the scope of the present invention.

In the first embodiment, the permanent magnet 27 is disposed in the radial gap 16 corresponding to the claw portion 21b. However, the radial gap 16 may be left void without disposing the permanent magnet 27 in the radial gap 16.

In the first embodiment, the example of fixing by the snap-fit coupling has been presented as a fixing method of the intervention member 30 to the magnetic pole holding member 23 and the projection portion 22b. However, welding or brazing of the engagement claw portion 34 to the engaged surfaces 22e and 23e, rivet caulking of the engagement claw portion 34 to the opening portion 26, or the like can also be used. According to this fixing method, the first magnetic pole 21 and the second magnetic pole 22 can be easily and reliably fixed to the magnetic pole holding member 23.

In the second embodiment, the permanent magnet 27 is disposed in the radial gap 16 in the claw portion 21b of the first magnetic pole 21. However, the radial gap 16 may be left void without disposing the permanent magnet 27 in the radial gap 16 in the claw portion 21b.

In the second embodiment, the example of bolting with the bolt 138 has been presented as a fixing method of the first magnetic pole 21 and the second magnetic pole 22 to the magnetic pole holding member 23. However, welding, rivet caulking, brazing, or the like can also be used. According to this fixing method, the first magnetic pole 21 and the second magnetic pole 22 can be easily and reliably fixed to the magnetic pole holding member 23.

In FIG. 1 showing the schematic configuration of the rotary electric machine 1, the position of the stator 3 and the position of the field coil 7 may be interchanged, thereby providing a configuration in which the field coil 7 is disposed radially outside the rotor 2 and the stator 3 is disposed by being axially shifted with respect to the rotor 2. In this case, the first air gap 11 is formed between the rotor 2 and the stator 3, on the other hand, the second air gap 12 is formed between the rotor 2 and the field coil 7.

In the above embodiment, the rotor 2 is fixed to the outer shell (synchronous rotary member) of the power transmission device 4. In a case where the power transmission device 4 is a torque converter, for example, the outer shell (synchronous rotary member) of the power transmission device 4 is a front cover of the torque converter or a drive plate connected to the engine 8 side. Examples of the synchronous rotary member having a similar function include a clutch cover of a friction type clutch, a flywheel connected to the engine 8 side of the friction type clutch, an outer shell of a fluid coupling, and a drive plate connected to the engine 8 side of the fluid coupling.

In the above embodiments, as an example, the rotary electric machine 1 is disposed between the engine 8 and the transmission 9 along the rotation axis 10. However, the rotary electric machine 1 may be replaced with an alternator, connected to the output shaft of the engine 8, disposed between the engine 8 and the transmission 9, disposed between the transmission 9 and a drive shaft, or mounted to the drive shaft itself.

The rotary electric machine 1 of this invention is not limited to use for vehicles but can also be used for widely-used generators and electric motors.

This invention and the embodiments are summarized as follows.

A rotary electric machine 1 according to one aspect of this invention includes:

a stator 3 having a stator winding 14 that generates a rotating magnetic field by an alternating current;

a rotor 2 that is rotatably held about a rotation axis 10 with respect to the stator 3; and a field coil 7 that excites the rotor 2 by a direct current, wherein:

the rotor 2 includes a first magnetic pole 21 that has a first annular portion 21a and a plurality of claw portions 21b extending in an axial direction of the rotation axis 10 from the first annular portion 21a, and a second magnetic pole 22 that has a second annular portion 22a and a plurality of projection portions 22b radially projecting on an outer circumferential surface of the second annular portion 22a;

in the rotor 2, the claw portions 21b of the first magnetic pole 21 and the projection portions 22b of the second magnetic pole 22 are circumferentially alternately positioned, and the first magnetic pole 21 and the second magnetic pole 22 are maintained in a non-contact state by providing a radial gap 16, a circumferential gap 17, and an axial gap 18 between the first magnetic pole 21 and the second magnetic pole 22;

the rotor 2 further includes a gap arrangement member 30; 130 of a non-magnetic material arranged in the radial gap 16 or the circumferential gap 17; and the gap arrangement member 30; 130 has an axial positioning portion 32, 34; 132 that is axially locked with respect to at least one of the first magnetic pole 21 and the second magnetic pole 22, and axially positions the first magnetic pole 21 and the second magnetic pole 22.

According to the above configuration, radial positioning or circumferential positioning of the first magnetic pole 21 and the second magnetic pole 22 is performed by the gap arrangement member 30; 130 of the non-magnetic material arranged in the radial gap 16 or the circumferential gap 17, and axial positioning is performed by the axial positioning portion 32, 34; 132 of the gap arrangement member 30; 130. Accordingly, by the gap arrangement member 30; 130 providing the plurality of functions, the structure in which the first magnetic pole 21 and the second magnetic pole 22 are positioned while being maintained in a non-contact state radially or circumferentially and axially can be simply and easily achieved.

Further, in the rotary electric machine 1 of one embodiment, the gap arrangement member 30 is arranged in the radial gap 16, and performs radial positioning of the first magnetic pole 21 and the second magnetic pole 22.

According to the above embodiment, by the gap arrangement member 30 providing the plurality of functions, the structure in which the first magnetic pole 21 and the second magnetic pole 22 are positioned while being maintained in a non-contact state radially and axially can be simply and easily achieved.

Further, in the rotary electric machine 1 of one embodiment, the rotor 2 further includes the magnetic pole holding member 23 of the non-magnetic material that radially holds the claw portion 21b of the first magnetic pole 21.

According to the above embodiment, the claw portion 21b of the first magnetic pole 21 is radially held by the magnetic pole holding member 23, and it is hence possible to resist the centrifugal force acting at the time of rotation.

Further, in the rotary electric machine 1 of one embodiment, the magnetic pole holding member 23 includes the overhanging portion 28 arranged in the circumferential gap 17.

According to the above embodiment, the circumferential phase shift between the first magnetic pole 21 and the second magnetic pole 22 is resolved by the overhanging portion 28, and thus torque is reliably transmitted between the first magnetic pole 21 and the second magnetic pole 22.

Further, in the rotary electric machine 1 of one embodiment, the rotor 2 has the engagement recess portion 38 on the one axial side and the engaged surface 22e on the other axial side, the gap arrangement member 30 has the engagement protrusion portion 32 that engages with the engagement recess portion 38 on the one axial side and the engagement claw portion 34 that engages with the engaged surface 22e on the other axial side, and the engagement protrusion portion 32 and the engagement claw portion 34 serve as the axial positioning portions.

According to the above embodiment, axial positioning can be simply and easily achieved by the engagement protrusion portion 32 engaging with the engagement recess portion 38 and the engagement claw portion 34 engaging with the engaged surface 22e of the rotor 2.

Further, in the rotary electric machine 1 of one embodiment, the rotor 2 has the engagement recess portion 38 on the one axial side and the magnetic pole holding member 23 has the engaged surface 23e on the other axial side, the gap arrangement member 30 has the engagement protrusion portion 32 that engages with the engagement recess portion 38 on the one axial side and the engagement claw portion 34 that engages with the engaged surface 23e on the other axial side, and the engagement protrusion portion 32 and the engagement claw portion 34 serve as the axial positioning portions.

According to the above embodiment, axial positioning can be simply and easily achieved by the engagement protrusion portion 32 engaging with the engagement recess portion 38 and the engagement claw portion 34 engaging with the engaged surface 23e of the magnetic pole holding member 23.

Further, in the rotary electric machine 1 of one embodiment, the field coil 7 is disposed side by side in the axial direction of the rotation axis 10 with respect to the rotor 2.

According to the above embodiment, an increase in the radial thickness of the field coil 7 allows magnetic flux of the field coil 7 to be increased and the degree of freedom of design to be increased.

Further, the rotary electric machine 1 of one embodiment, further includes the permanent magnet 27 in the radial gap 16 in the same circumferential position as the claw portion 21b of the first magnetic pole 21 and between the inner circumferential surface of the claw portion 21b and the outer circumferential surface of the second annular portion 22a.

According to the above embodiment, the output performance of the rotary electric machine 1 can be improved by using magnetic flux by the permanent magnet 27 in addition to magnetic flux by the field coil 7.

Further, in the rotary electric machine 1 of one embodiment, the gap arrangement member 130 is arranged in the circumferential gap 17, and performs circumferential positioning of the first magnetic pole 21 and the second magnetic pole 22.

According to the above embodiment, by the gap arrangement member 130 providing the plurality of functions, the structure in which the first magnetic pole 21 and the second magnetic pole 22 are positioned while being maintained in a non-contact state circumferentially and axially can be simply and easily achieved.

Further, in the rotary electric machine 1 of one embodiment, the rotor 2 further includes the magnetic pole holding member 23 of the non-magnetic material that radially holds the first magnetic pole 21 and the second magnetic pole 22.

According to the above embodiment, the first magnetic pole 21 and the second magnetic pole 22 are radially held by the magnetic pole holding member 23, and it is hence possible to resist the centrifugal force acting at the time of rotation.

Further, in the rotary electric machine 1 of one embodiment, the gap arrangement member 130 is fixed to the magnetic pole holding member 23 in a state where the axial positioning portion 132 is engaged with the claw portion 21b.

According to the above embodiment, the first magnetic pole 21 and the second magnetic pole 22 are fixed while being maintained in a non-contact state radially, circumferentially, and axially.

Further, in the rotary electric machine 1 of one embodiment, the claw portion 21b has the engagement projection portion 121d circumferentially protruding on the side facing the projection portion 22b, the gap arrangement member 130 has the axial engagement portion 132 axially engaging with respect to the engagement projection portion 121d on the side not facing the magnetic pole holding member 23, and the axial engagement portion 132 of the gap arrangement member 130 engages with the engagement projection portion 121d of the claw portion 21b.

According to the above embodiment, since the axial engagement portion 132 of the gap arrangement member 130 engages with the engagement projection portion 121d of the claw portion 21b, axial engagement can be easily achieved.

Further, in the rotary electric machine 1 of one embodiment, the claw portion 21b of the first magnetic pole 21 has the first tip end locking portion 21c at the end edge on the magnetic pole holding member 23 side, the projection portion 22b of the second magnetic pole 22 has the second tip end locking portion 122c at the end edge on the magnetic pole holding member 23 side, and the magnetic pole holding member 23 has the fitting portion 123a fitted to the first tip end locking portion 21c and the second tip end locking portion 122c on the outer circumferential side.

According to the above embodiment, the first magnetic pole 21 and the second magnetic pole 22 are fixedly held with respect to the radial direction by the magnetic pole holding member 23.

Further, in the rotary electric machine 1 of one embodiment, the outer circumferential surface of the first tip end locking portion 21c and the outer circumferential surface of the second tip end locking portion 122c are positioned on the same circumference about the axial center of the rotation axis 10.

According to the above embodiment, it is easy to fit the first tip end locking portion 21c and each of the second tip end locking portions 122c with the fitting portion 123a of the magnetic pole holding member 23.

Further, in the rotary electric machine 1 of one embodiment, fixing of the gap arrangement member 130 to the magnetic pole holding member 23 is bolting, welding, rivet caulking, or brazing.

According to the above embodiment, the gap arrangement member 130 can be easily and reliably fixed to the magnetic pole holding member 23.

Further, in the rotary electric machine 1 of one embodiment, the field coil 7 is disposed side by side in the axial direction of the rotation axis 10 with respect to the rotor 2.

According to the above embodiment, an increase in the radial thickness of the field coil 7 allows magnetic flux of the field coil 7 to be increased and the degree of freedom of design to be increased.

Further, the rotary electric machine 1 of one embodiment, further includes the permanent magnet 27 in the radial gap 16 in the same circumferential position as the claw portion 21b of the first magnetic pole 21 and between the inner circumferential surface of the claw portion 21b and the outer circumferential surface of the second annular portion 22a.

According to the above embodiment, the output performance of the rotary electric machine 1 can be improved by using magnetic flux by the permanent magnet 27 in addition to magnetic flux by the field coil 7.

What is claimed is:

1. A brushless wound field type rotary electric machine, comprising:

a stator having a stator winding that generates a rotating magnetic field by an alternating current;

a rotor that is rotatably held about a rotation axis with respect to the stator; and a field coil that excites the rotor by a direct current, wherein:

the rotor includes a first magnetic pole that has a first annular portion and a plurality of claw portions extending in an axial direction of the rotation axis from the first annular portion, and a second magnetic pole that has a second annular portion and a plurality of projection portions radially projecting on an outer circumferential surface of the second annular portion;

in the rotor, the claw portions of the first magnetic pole and the projection portions of the second magnetic pole are circumferentially alternately positioned, and the first magnetic pole and the second magnetic pole are maintained in a non-contact state by providing a radial gap, a circumferential gap, and an axial gap between the first magnetic pole and the second magnetic pole;

the rotor further includes a gap arrangement member of a non-magnetic material arranged in the radial gap or the circumferential gap; and an axial end of the gap arrangement member serves as an axial positioning portion that is axially locked with respect to at least one of the first magnetic pole and the second magnetic pole, and axially positions the first magnetic pole and the second magnetic pole, the axial end of the gap arrangement member contacting both of the first magnetic pole and the second magnetic pole.

2. The rotary electric machine according to claim 1, wherein the gap arrangement member is arranged in the radial gap, and performs radial positioning of the first magnetic pole and the second magnetic pole.

3. The rotary electric machine according to claim 1, wherein the rotor further includes a magnetic pole holding member of a non-magnetic material that radially holds the claw portion of the first magnetic pole.

4. The rotary electric machine according to claim 3, wherein the magnetic pole holding member includes an overhanging portion arranged in the circumferential gap.

5. The rotary electric machine according to claim 3, wherein:
the rotor has an engagement recess portion on a first axial side and the magnetic pole holding member has an engaged surface on a second axial side;
the axial end of the gap arrangement member is disposed on the first axial side and is configured to engage with the engagement recess portions; and
the gap arrangement member has an engagement claw portion disposed on the second axial side and configured to engage with the engaged surface.

6. The rotary electric machine according to claim 1, wherein:
the rotor has an engagement recess portion on a first axial side and has an engaged surface on a second axial side;
the axial end of the gap arrangement member is disposed on the first axial side and is configured to engage with the engagement recess portions; and
the gap arrangement member has an engagement claw portion disposed on the second axial side and configured to engage with the engaged surface.

7. The rotary electric machine according to claim 1, wherein the field coil is disposed side by side in an axial direction of the rotation axis with respect to the rotor.

8. The rotary electric machine according to claim 1, further comprising a permanent magnet in the radial gap in a same circumferential position as the claw portion of the first magnetic pole and between an inner circumferential surface of the claw portion and an outer circumferential surface of the second annular portion.

9. The rotary electric machine according to claim 1, wherein the gap arrangement member is arranged in the circumferential gap, and performs circumferential positioning of the first magnetic pole and the second magnetic pole.

10. The rotary electric machine according to claim 9, wherein the rotor further includes a magnetic pole holding member of a non-magnetic material that radially holds the first magnetic pole and the second magnetic pole.

11. The rotary electric machine according to claim 10, wherein the gap arrangement member is fixed to the magnetic pole holding member in a state where the axial positioning portion is engaged with the claw portion.

12. The rotary electric machine according to claim 10, wherein:
the claw portion has an engagement projection portion circumferentially protruding on a side facing the projection portion;
the gap arrangement member has an axial engagement portion axially engaging with respect to the engagement projection portion on a side not facing the magnetic pole holding member; and
the axial engagement portion of the gap arrangement member engages with the engagement projection portion of the claw portion.

13. The rotary electric machine according to claim 10, wherein:
the claw portion of the first magnetic pole has a first tip end locking portion at an end edge on a side of the magnetic pole holding member;
the projection portion of the second magnetic pole has a second tip end locking portion at an end edge on a side of the magnetic pole holding member; and
the magnetic pole holding member has a fitting portion fitted to the first tip end locking portion and the second tip end locking portion on an outer circumferential side.

14. The rotary electric machine according to claim 13, wherein an outer circumferential surface of the first tip end locking portion and an outer circumferential surface of the second tip end locking portion are positioned on a same circumference about an axial center of the rotation axis.

15. The rotary electric machine according to claim 10, wherein fixing of the gap arrangement member to the magnetic pole holding member is by bolting, welding, rivet caulking, or brazing.

16. The rotary electric machine according to claim 9, wherein the field coil is disposed side by side in the axial direction of the rotation axis with respect to the rotor.

17. The rotary electric machine according to claim 9, further comprising a permanent magnet in the radial gap in a same circumferential position as the claw portion of the first magnetic pole and between an inner circumferential surface of the claw portion and an outer circumferential surface of the second annular portion.

* * * * *